United States Patent
Di Gregorio et al.

(10) Patent No.: US 11,615,022 B2
(45) Date of Patent: Mar. 28, 2023

(54) APPARATUS AND METHOD FOR HANDLING ACCESSES TARGETING A MEMORY

(71) Applicant: Arm Limited, Cambridge (GB)

(72) Inventors: Lorenzo Di Gregorio, Munich (DE); Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 188 days.

(21) Appl. No.: 16/943,121

(22) Filed: Jul. 30, 2020

(65) Prior Publication Data

US 2022/0035740 A1 Feb. 3, 2022

(51) Int. Cl.
| | | |
|---|---|---|
| *G06F 12/0811* | (2016.01) | |
| *G06F 1/3206* | (2019.01) | |
| *G06F 1/3296* | (2019.01) | |
| *G06F 12/0815* | (2016.01) | |

(52) U.S. Cl.
CPC ........ *G06F 12/0811* (2013.01); *G06F 1/3206* (2013.01); *G06F 1/3296* (2013.01); *G06F 12/0815* (2013.01)

(58) Field of Classification Search
CPC ............... G06F 12/0811; G06F 1/3206; G06F 1/3296; G06F 12/0815; G06F 1/3209; G06F 1/3287; G06F 3/0625; G06F 1/3275
See application file for complete search history.

(56) References Cited

U.S. PATENT DOCUMENTS

| | | | | |
|---|---|---|---|---|
| 8,909,980 B1 * | 12/2014 | Lewis | ................... | G06F 3/067 |
| | | | | 714/4.11 |
| 9,203,895 B1 * | 12/2015 | Sauer | ..................... | G06F 30/30 |
| 9,274,592 B2 * | 3/2016 | Jahagirdar | ........ | G06F 12/0811 |

(Continued)

OTHER PUBLICATIONS

Microsoft, "Computer Dictionary", Fifth Edition, 2002, p. 279. (Year: 2002).*

(Continued)

*Primary Examiner* — Christopher D Birkhimer
(74) *Attorney, Agent, or Firm* — Nixon & Vanderhye P.C.

(57) ABSTRACT

An apparatus is described that has processing circuitry for performing operations, and a communication path employed by the processing circuitry to access a first memory. Switch circuitry, when activated, is connected to the communication path. The processing circuitry issues access commands specifying addresses to be accessed, where each address is mapped to location in a memory system in accordance with a system address map. The memory system comprises at least the first memory and a second memory. When in a particular mode, the processing circuitry performs operations that require access to only a subset of the locations provided in the first memory. The switch circuitry is arranged, whilst the processing circuitry is in the particular mode, to be activated in order to intercept the access commands issued over the communication path that specify addresses mapped by the system address map to locations within the subset of locations. Those intercepted access commands are redirected to locations within the second memory that are otherwise unused whilst the processing circuitry is in the particular mode. This can provide significant power consumption benefits.

19 Claims, 12 Drawing Sheets

(56) References Cited

U.S. PATENT DOCUMENTS

| | | | | |
|---|---|---|---|---|
| 9,977,488 | B1* | 5/2018 | Kong | G06F 1/3287 |
| 10,540,247 | B2* | 1/2020 | Kazi | G06F 11/2094 |
| 10,552,058 | B1* | 2/2020 | Jadon | G06F 3/0647 |
| 2006/0143362 | A1* | 6/2006 | Li | G06F 8/61 |
| | | | | 711/100 |
| 2008/0082752 | A1* | 4/2008 | Chary | G06F 1/32 |
| | | | | 711/118 |
| 2008/0104437 | A1* | 5/2008 | Lee | G06F 1/3275 |
| | | | | 713/323 |
| 2009/0024799 | A1* | 1/2009 | Jahagirdar | G06F 1/3287 |
| | | | | 711/E12.052 |
| 2012/0054518 | A1* | 3/2012 | Sadowski | G06F 1/3275 |
| | | | | 711/E12.001 |
| 2013/0305373 | A1* | 11/2013 | Lim | G06F 21/566 |
| | | | | 726/24 |
| 2015/0278333 | A1* | 10/2015 | Hirose | G06F 16/283 |
| | | | | 707/607 |
| 2015/0356005 | A1* | 12/2015 | Hayes | G06F 3/0647 |
| | | | | 711/102 |
| 2016/0203049 | A1* | 7/2016 | Kim | G11C 29/42 |
| | | | | 714/721 |
| 2017/0300422 | A1* | 10/2017 | Szubbocsev | G06F 12/1009 |
| 2018/0101489 | A1* | 4/2018 | Brown | G06F 13/385 |
| 2018/0120926 | A1* | 5/2018 | Brown | G06F 1/3203 |
| 2018/0173637 | A1* | 6/2018 | Shifer | G06F 12/0804 |
| 2018/0225059 | A1* | 8/2018 | Haas Costa | G06F 12/06 |
| 2019/0094939 | A1* | 3/2019 | Yeager | G06F 1/3234 |
| 2020/0004725 | A1* | 1/2020 | Ben Dayan | G06F 16/1734 |
| 2020/0125157 | A1* | 4/2020 | Kachare | G06F 3/0625 |
| 2020/0133523 | A1* | 4/2020 | Xia | G06F 21/73 |

OTHER PUBLICATIONS

Jim Handy, "The Cache Memory book: The authoritative reference on cache design", Second Edition, 1993, pp. 64-67 (Year: 1993).*

Larry Hardesty, "Flash-memory system could reduce power consumption of data center 'caches' by 90 percent", Aug. 21, 2017, pp. 1-3, https://techxplore.com/news/2017-08-flash-memory-power-consumption-center-caches.html (Year: 2017).*

Lucas Mearian, "MIT proves flash is as fast as RAM, and cheaper, for big data", Jul. 13, 2015, pp. 1-4, https://www.arnnet.com.au/article/579562/mit-proves-flash-fast-ram-cheaper-big-data/ (Year: 2015).*

* cited by examiner

APPARATUS AND METHOD FOR HANDLING ACCESSES TARGETING A MEMORY

BACKGROUND

The present technique relates to an apparatus and method for handling accesses targeting a memory.

An apparatus may be provided with processing circuitry for performing operations, and when performing those operations the processing circuitry may access a memory containing data to be processed and/or instructions defining the operations to be performed. When in one or more particular modes of operation, the processing circuitry may not require access to the full address space of that memory, and instead may, in respect of that memory, only need to access a subset of the locations within that memory. It would be desirable to enable the power consumption of the apparatus to be reduced when the processing circuitry is in such a mode of operation.

SUMMARY

In one example arrangement, there is provided an apparatus comprising: processing circuitry to perform operations; a communication path employed by the processing circuitry to access a first memory; and switch circuitry arranged, when activated, to be connected to the communication path; wherein: the processing circuitry is arranged to issue access commands specifying addresses to be accessed, each address being mapped to a location in a memory system in accordance with a system address map, the memory system comprising at least the first memory and a second memory; the processing circuitry is arranged, when in a particular mode, to perform operations that require access to only a subset of the locations provided in the first memory; and the switch circuitry is arranged, whilst the processing circuitry is in the particular mode, to be activated in order to intercept the access commands issued over the communication path that specify addresses mapped by the system address map to locations within the subset of locations, and to redirect those access commands to locations with the second memory that are otherwise unused whilst the processing circuitry is in the particular mode. In another example arrangement, there is provided a method of handling accesses targeting a first memory, comprising: providing a communication path for use by processing circuitry to access the first memory; providing switch circuitry arranged, when activated, to be connected to the communication path; issuing from the processing circuitry access commands specifying addresses to be accessed, each address being mapped to a location in a memory system in accordance with a system address map, the memory system comprising at least the first memory and a second memory; arranging the processing circuitry, when in a particular mode, to perform operations that require access to only a subset of the locations provided in the first memory; and activating the switch circuitry, whilst the processing circuitry is in the particular mode, in order to intercept the access commands issued over the communication path that specify addresses mapped by the system address map to locations within the subset of locations, and to redirect those access commands to locations with the second memory that are otherwise unused whilst the processing circuitry is in the particular mode.

In a still further example arrangement there is provided an apparatus comprising: processing means for performing operations; communication path means for employing by the processing means to access a first memory; and switch means, when activated, for connecting to the communication path means; wherein: the processing means is for issuing access commands specifying addresses to be accessed, each address being mapped to a location in a memory system in accordance with a system address map, the memory system comprising at least the first memory and a second memory; the processing means is arranged, when in a particular mode, to perform operations that require access to only a subset of the locations provided in the first memory; and the switch means is arranged, whilst the processing means in the particular mode, to be activated in order to intercept the access commands issued over the communication path means that specify addresses mapped by the system address map to locations within the subset of locations, and to redirect those access commands to locations with the second memory that are otherwise unused whilst the processing means is in the particular mode.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

Figure 1:
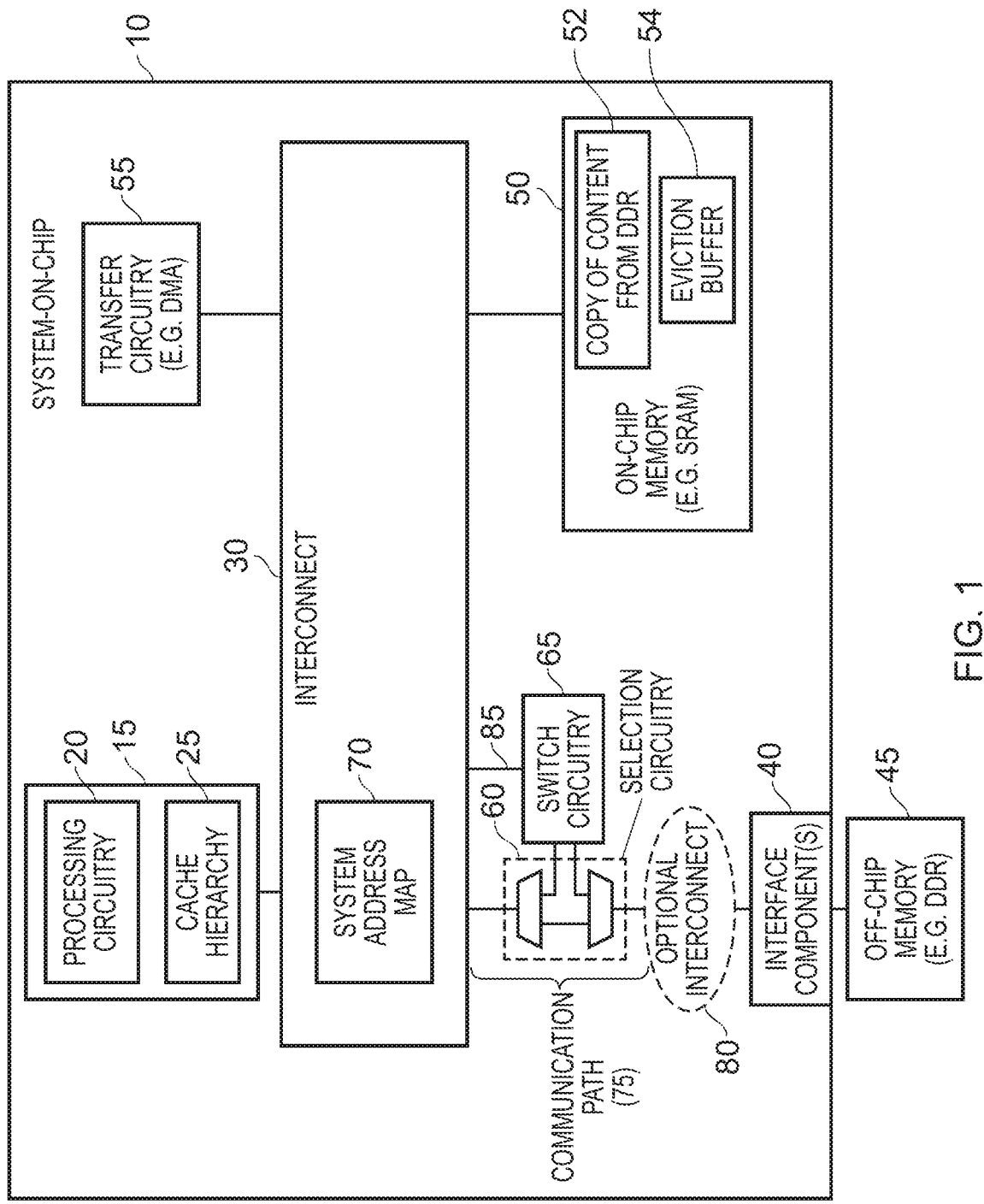
FIG. 1 is a block diagram of an apparatus in accordance with one example arrangement.

In data processing systems, there is a cost associated with accessing memory, for example in terms of the power consumption consumed in performing such accesses, and/or the time taken to perform such accesses. In some modes of operation, processing circuitry provided within an apparatus to perform operations may only need to access a subset of the locations provided by such a memory, and the techniques described herein are aimed at enabling a reduction in power consumption in such situations.

In one example implementation the apparatus has processing circuitry for performing operations and a communication path employed by the processing circuitry to access a first memory. The first memory may be formed of a single, discrete, memory device, or may be constituted by a number of memory devices. The processing circuitry is arranged to issue access commands specifying addresses to be accessed, where each address is mapped to a location in a memory system in accordance with a system address map. The memory system comprises at least the earlier-mentioned first memory, and a second memory, and may potentially comprise additional memories.

The processing circuitry is arranged, when in a particular mode, to perform operations that require access to only a subset of the locations provided in the first memory. The particular mode can take a variety of forms, but could for example be a low power mode of operation. In such instances, in order to increase the power consumption benefit of being in a low power mode, it would be desirable to reduce the power consumption associated with accessing memory. However, as mentioned above, when in the particular mode the processing circuitry does still require access to data and/or instructions stored in the first memory, even if there are significant parts of the first memory that do not need to be accessed.

In accordance with the techniques described herein, the apparatus is further provided with switch circuitry that is arranged, when activated, to be connected to the communication path. Switch circuitry can then be activated whilst the processing circuitry is in the particular mode mentioned earlier, and once activated will intercept access commands issued over the communication path that specify addresses mapped by the system address map to locations within the subset of locations of the first memory. The switch circuitry then redirects those access commands to locations within the second memory that are otherwise unused whilst the processing circuitry is in the particular mode.

The inventors observed that when the processing circuitry is in the earlier-mentioned particular mode, there are locations within the second memory that are not used. Typically, one might consider powering down the second memory, or placing it in a lower power state, in such a situation, so as to reduce energy consumption within the apparatus. However, the inventors realised that, rather than taking such steps, those unused locations within the second memory can be used to effectively virtualise accesses to the subset of locations provided in the first memory, thus avoiding the cost of accessing the first memory whilst the processing circuitry is in the particular mode. Furthermore, by employing the switch circuitry to take such steps, this can be done essentially transparently to the processing circuitry, and in a manner that is not architecturally visible to the processing circuitry. As a result, there is no need for the system address map to be altered, which would typically require costly operations in terms of both time and power consumption, for example by requiring cache structures to be flushed, and address translation structures such as translation lookaside buffers (TLBs) to be reconfigured.

Instead, the processing circuitry can continue to operate in its standard manner, and hence issue addresses that are mapped by the system address map to locations within the first memory, and the switch circuitry can then intercept such access commands, and redirect them to the unused locations within the second memory. It has been found that the switch circuitry can be arranged to be connected and disconnected from the communication path in a manner that does not affect the critical paths and latency to the first memory, and that the switch circuitry can be arranged to operate in manner that does not require any significant stalling of accesses issued in respect of the first memory.

This is to be contrasted with an approach which involves seeking to alter the system address map used by the processing circuitry, which as discussed earlier would typically require cleaning of cache contents and the reprogramming of TLBs so that the accesses issued by the processing circuitry directly targeted the second memory rather than the first memory whilst the processing circuitry was in the particular mode. Such an approach would require time intensive operations that could significantly reduce the time available to benefit from the power savings that result from avoiding access to the first memory, and would significantly increase the power cost associated with transitioning from use of the first memory to use of the second memory. Such an approach would also typically require a significant stalling of accesses issued to the first memory, since data would typically be migrated one page at a time, and access to such a page would be prevented until the transfer of that page is complete and the TLB has been updated. Writes may also be prevented from being cached during that transition period, as the cache would need to remain clean.

In contrast to such an approach, in accordance with the techniques described herein the system address map remains unchanged, and the first memory is virtualised in a manner that is essentially transparent to the processing circuitry. In particular, the processing circuitry continues to act in its normal manner, with the switch being activated so as to be connected into the communication path between the processing circuitry and the first memory, so that access commands issued over the communication path that specify addresses mapped by the system address map to locations within the first memory are intercepted and redirected to the available locations within the second memory.

It has been found that the technique described herein can enable significant power consumption benefits to be realised when the processing circuitry is operating in the particular mode described earlier. For instance, by employing such techniques, it may then be possible to place the first memory in a low power state, and for certain types of memory it may even be possible to power off the first memory. In addition, it may be possible to power off one or more of the interface components that are provided within the apparatus to interface with the first memory, further improving the power consumption benefits that may be realised.

The first and second memories can be of various different types. In some implementations the second memory may be more energy efficient to access than the first memory. For example, the first memory may be remote memory and the second memory may be local memory, and as a result the access speed to the first memory may be significantly slower than the access speed to the local memory, such that it is more energy efficient to access the local memory. By taking the steps described herein, accesses to the remote memory can be intercepted in an architecturally invisible manner to the processing circuitry, and redirected to the local memory, thus allowing for significant power consumption savings. In one particular example implementation, the apparatus takes the form of a System-on-Chip (SoC), the first memory is off-chip memory and the second memory is on-chip memory. The earlier-mentioned communication path may then be a path provided by the apparatus to off-chip memory. The switch circuitry is arranged, when activated, to be connected to the communication path such that it can observe all traffic between the processing circuitry (and its associated cache hierarchy) and the first memory.

It has been found that there are many situations where there may be sufficient unused space in the second memory when the processing circuitry is operating in the particular mode, to allow for the above-mentioned virtualisation of the first memory to be performed using the switch circuitry. For example, one particular use case may be in communication devices where multiple channels may be provided, and the second memory may provide buffer space for each of the channels. However, when the processing circuitry is in certain modes of operation, for example a low power mode, there may be relatively few of those channels that are actively being used, for example data channels may become idle. As a result, the buffer space allocated in the second memory for such channels will be unused, and it has been found that often there is sufficient space within those unused locations of the second memory to accommodate all of the content that still needs to be accessed by the processing circuitry from the first memory whilst the processing circuitry is operating in the particular mode.

In one example implementation the apparatus further comprises transfer circuitry arranged, in response to the switch circuitry being activated, to transfer, for each location within the subset of locations of the first memory, content stored in that location to an associated location in the second memory that is otherwise unused whilst the processing circuitry is in the particular mode.

Whilst such a transfer operation is being performed, it has been found that it is not necessary to stall to any significant extent memory access activities of the processing circuitry, and instead the switch circuitry can be arranged to track the progress of the transfer operation and handle each access command received by the processing circuitry appropriately, dependent on the address seeking to be accessed by that access command.

For instance, in one example implementation the switch circuitry may be arranged to maintain a record identifying the locations within the subset of locations of the first memory whose content has been transferred, and to only redirect a given intercepted access command to the second memory once the record identifies that the location in the first memory identified by the address specified by that given intercepted access command has had its content transferred. Hence, if a given access command is received that relates to an address whose content has already been transferred, then that access command can immediately be redirected to the appropriate location in the second memory. In contrast, if an access command is received that specifies an address in the first memory whose content has not yet been transferred, then this will be detected when referencing the above-mentioned record, and the switch circuitry can in that instance treat the access command differently. For instance, in one example implementation the switch circuitry is arranged to suppress acceptance of that access command until the content has been transferred to the second memory.

There are a number of ways in which acceptance of an access command can be suppressed, but in one example implementation a handshake protocol is used for communications over the communication channel, and hence an efficient mechanism that may be used to suppress acceptance of an access command is to inhibit provision of the required handshake signal for that access command, for example by suppressing the issuance of an acknowledgement signal. In such instances, the processing circuitry may be arranged to continue to assert the access command until it is accepted.

In one example implementation, the switch circuitry is arranged, once the content stored within all of the locations forming the subset of locations has been transferred to the second memory, to issue a memory release signal to power management circuitry to allow the first memory to be placed within a low power state. The steps actually taken by the power management circuitry upon receipt of such a memory release signal may vary dependent on implementation. For instance, it may the case that other entities within the system may also at certain points in time need to access the first memory, and hence the power management circuitry may take into account the state of those other entities before deciding whether to place the first memory into the low power state upon receipt of the memory release signal from the switch circuitry. However, assuming no other entities need to access the first memory, then the power management circuitry may respond to the memory release signal by placing the first memory within the low power state.

The low power state that can a variety of forms, and may for example be a memory retention state that is used to ensure that the contents stored in the first memory are not lost, whilst allowing significant power consumption savings to be realised. Depending on the type of memory device used to implement the first memory, it may in fact be the case that the memory could be powered off without losing content, for example in situations where the memory is flash memory.

Irrespective of whether the first memory is placed into the low power state or not in response to the memory release signal, other power consumption saving steps may also be taken once the memory release signal has been issued. For example, there may be one or more interface components provided by the apparatus that are used to connect to the first memory, and the issuance of the memory release signal by the switch circuitry may further allow such components to be powered down, thereby providing further power consumption benefits.

In one example implementation the apparatus further comprises cache storage used by the processing circuitry to cache content associated with addresses mapped to locations in the first memory, the cache storage being arranged, on eviction of a block of content from the cache storage, to issue a write access command over the communication path specifying both the evicted content and an address of a location in the first memory (also referred to as the destination address) to which that evicted block of content is to be stored. The switch circuitry is arranged, whilst activated, to intercept the write access commands issued by the cache storage.

As mentioned earlier, due to the virtualisation of the first memory being performed in a manner that is architecturally invisible, the contents of the cache are not flushed prior to activating the switch, and hence the evictions occurring from the cache can relate to a wide variety of addresses, including addresses that are not actually accessed by the processing circuitry whilst in the above-mentioned particular mode.

However, in accordance with the techniques described herein, by analysing the destination address specified by the write access commands resulting from cache evictions, a mechanism can be provided to ensure that such data is not lost when it is evicted from the cache.

In particular, the apparatus can be arranged to further comprise buffer storage that is allocated for use by the switch circuitry. The switch circuitry can then be arranged, in response to intercepting a write access command issued by the cache storage that specifies an address that maps to a location in the first memory not expected to be accessed by the processing circuitry when in the particular mode, to store the evicted block of content and an indication of the specified address in the buffer storage. Hence, the switch circuitry can intercept data evicted from the cache, and when that data relates to addresses outside of the subset of locations that it is known the processing circuitry may access, that content can be buffered within the buffer storage along with an indication of the associated address, so that it can in due course be restored to the first memory once the virtualisation of the first memory has ceased.

Whilst in some implementations it may be possible for the buffer circuitry to be sized appropriately taking into account an expected maximum amount of data that may be evicted from the cache, it is not essential that the buffer circuitry is sized so that it can always guarantee to have space to store all of the evicted content. In particular, in one example implementation the switch circuitry may be responsive to the buffer circuitry reaching a threshold fullness level, to issue an exception signal to trigger an exception handling routine to be executed. The steps taken by the exception handling routine may vary dependent on implementation. However, in one example implementation performance of the exception handling routine may cause the virtualisation process to be stopped, so that the first memory is returned to its full power state, and any content of the first memory that has been mapped to the second memory is then restored into the first memory. This will include not only the content associated with the range of addresses that has been virtualised, but also the content that has been buffered within the buffer storage. Following the performance of such an exception handling routine, it may be decided appropriate to leave the first memory in its powered state, or alternatively it may be decided to re-invoke the above-mentioned virtualisation process so as to allow the switch to be reconnected into the communication path and for subsequent accesses to the subset of locations of the first memory to be intercepted and routed to free locations in the second memory.

As another alternative option, rather than performance of the exception handling routine causing the virtualisation process to be stopped, the performance of the exception handling routine could cause the first memory to be powered up so that the eviction buffer can be drained, with the switch circuitry staying connected so that once the eviction buffer is drained the memory release signal can again be issued. This may for example be appropriate in situations where the exception is considered likely to only arise rarely, and hence it is desired to allow the eviction buffer to be flushed whilst the virtualisation process is continued.

The buffer storage can take a variety of forms, but in one example implementation is allocated within available locations of the second memory that are otherwise unused while the processing circuitry is in the particular mode. This provides a particularly efficient implementation of the buffer storage, by avoiding the need to provide dedicated buffer storage for use by the apparatus.

In addition to the above-mentioned example situation where an exception signal may be issued, the switch circuitry may also be arranged to issue exception signals in certain other situations. For example, the switch circuitry may be arranged, in response to intercepting a read access command specifying an address that maps to a location in the first memory outside of the subset of locations to be accessed by the processing circuitry when in the particular mode, to issue an exception signal to trigger an exception handling routine to be executed. In particular, since it is expected that the processing circuitry will only access a subset of the locations provided in the first memory when the processing circuitry is operating in the earlier-mentioned particular mode, if the processing circuitry performs a read to an address that corresponds to a location outside of that subset, then this is not expected behaviour, and it is appropriate to trigger an exception. This is to be contrasted with the possibility of write access commands being intercepted by the switch circuitry that relate to locations in the first memory outside of the expected set of locations to be accessed, since as mentioned earlier such write access commands may result from legitimate cache eviction behaviour, given that the cache was not flushed prior to starting the memory virtualisation process. There are a number of ways in which the switch circuitry may be activated so as to be connected to the communication path in order to intercept access command issued over that communication path. However, in one example implementation the switch circuitry is activated in response to an activation command. Issuance of the activation command can be triggered in a variety of ways, but typically it will be issued following the processing circuitry having transitioned to the earlier-mentioned particular mode. In some instances, there may be some delay between the processing circuitry entering the particular mode and the activation command being issued. For example, the activation command may be triggered by the elapse of a timer which starts on the processing circuitry transitioning to the particular mode, so that the memory virtualisation technique is only triggered after the processing circuitry has been in the particular mode for a certain period of time.

In one example implementation, the switch circuitry is responsive to the activation command to perform an activation process in order to cause the switch circuitry to be connected to the communication path. The activation process can take a variety of forms, but will typically involve performance of a sequence of steps in order to allow the switch circuitry to be connected to the communication path in a way that does not disrupt the handling of ongoing communications, and in particular ensures that those communications conform to any communication protocol employed over the communication path.

In one example implementation, the apparatus further comprises selection circuitry provided within the communication path to select between a primary path bypassing the switch circuitry and a secondary path incorporating the switch circuitry. The switch circuitry is then arranged to perform the activation process by employing a backpressure mechanism to temporarily stop traffic passing over the primary path, and by controlling the selection circuitry to change its selection from the primary path to the secondary path such that the switch circuitry is connected to the communication path at a point in time where the application of the backpressure mechanism has ensured that the interception of communications by the switch circuitry occurs without compromising a communication protocol used to control traffic flow over the communication path. By employing the primary and secondary paths, and using the switch circuitry to control the switching between those paths, it has been found that the memory virtualisation technique employed herein can be implemented without adversely affecting the critical paths and latency to the first memory. Indeed, in some implementations the technique can be implemented with the requirement for only one 2:1 multiplexer on the memory access paths. Further, by employing the backpressure mechanism as described above, the technique described herein does not require any significant interruption in the traffic passing over the communication path.

The communication path can be organised in a variety of ways, but in one example implementation comprises a command channel and a response channel. In accordance with such an implementation, the selection circuitry may be arranged to comprise first selection circuitry for the command channel and second selection circuitry for the response channel. In one such example implementation, the backpressure mechanism is employed such that the switch circuitry is first connected to the command channel and thereafter connected to the response channel. Hence, by such an approach, this enables the switch circuitry to first gain ownership of the command channel of the communication path, and once ownership of the command channel has been obtained the switch circuitry can then obtain ownership of the response channel. The backpressure mechanism can be implemented in a variety of ways.

However, in one example implementation, each channel employs a handshake protocol, and the backpressure mechanism is used to delay a handshake signal within each of the command channel and the response channel for one or more clock cycles. It will be appreciated that various different handshake protocols may be used, for example a request/acknowledge handshake protocol, a valid/ready handshake protocol, etc. The backpressure mechanism can then be used to delay one of those signals, for example the acknowledgement signal when using a request/acknowledge handshake protocol or the ready signal when using a valid/ready handshake protocol.

In one example implementation, the backpressure mechanism is arranged to delay the handshake signal within the command channel until any outstanding command issued over the primary path of the command channel has also been propagated through the switch circuitry, and is arranged to delay a handshake signal within the response channel until no outstanding response traffic is present on the primary path of the response channel. By delaying the handshake signal within the command channel until any outstanding command issued over the primary path has also been propagated through the switch circuitry, this can ensure that there is no possibility of any reordering of commands occurring. In particular, it will be known by that point that there will be no active command on the primary path of the command channel.

When in due course it is determined that it is appropriate to stop the memory virtualisation process, and hence enable reuse of the first memory, then there are a number of ways in which the virtualisation process can be ended. In one example implementation, this occurs through the issuance of a redirection end command, and the switch circuitry is arranged to be responsive to such a redirection end command to issue a memory required signal to the power management circuitry to request that the first memory is exited from the low power state. It should be noted that it will not necessarily be the case that the first memory is actually in the low power state, as other factors within the system may have caused the power management circuitry not to place the first memory in the low power state. Nevertheless, to the extent the first memory is in the low power state, then the issuance of the memory required signal to the power management circuitry will in due course cause the first memory to be exited from the low power state.

Further, in response to the redirection end command, the switch circuitry is arranged to trigger transfer circuitry to transfer back to the first memory the content of the first memory that has been stored in the second memory due to the activation of the switch circuitry. In addition, following such a transfer, the switch circuitry performs a deactivation process in order to cause the switch circuitry to be disconnected from the communication path, whereafter the memory virtualisation process will have ended and all traffic destined for the first memory will proceed to the first memory in the usual manner.

When triggered by the switch circuitry following the redirection end command, the transfer circuitry is arranged to transfer back to the first memory all content stored in the second memory that is associated with addresses mapping to the subset of locations of the first memory (i.e. the subset of locations that the processing circuitry had access to when in the particular mode). During this process, the switch circuitry keeps a record identifying the locations within the subset of locations of the first memory whose content is being transferred back to the first memory, while the address translation table has not been updated yet. This enables it to handle appropriately any access commands issued by the processing circuitry specifying addresses mapping to those locations, whilst the transfer process is in operation. In particular, if the transfer has already occurred and the address translation table has been consistently updated, the access command can proceed to its destination, whereas otherwise the switch circuitry may temporarily prevent acceptance of that command until the transfer has taken place and the address translation table has been consistently updated.

As will be apparent from the earlier discussion, whilst the memory virtualisation process was in place, then in addition to the content stored in the second memory relating to addresses that map to the subset of locations of the first memory, evicted write data from cache storage with its destination addresses in the first memory may also have been intercepted and held in a buffer, and that evicted write data also needs to be written back to the first memory at its related destination address during the virtualisation ending process. Accordingly, the transfer circuitry is further arranged to transfer back, to its destination address in the first memory, any evicted write data from cache storage that was intercepted by the switch circuitry and held in the buffer along with that destination address.

With regard to the deactivation process performed by the switch circuitry, as mentioned earlier in one example implementation selection circuitry is provided within the communication path to select between a primary path bypassing the switch circuitry and a secondary path incorporating the switch circuitry. In such an implementation, the switch circuitry may be arranged to perform the deactivation process by employing a backpressure mechanism to temporarily stop traffic passing over the secondary path, and by controlling the selection circuitry to change its selection from the secondary path to the primary path such that the switch circuitry is disconnected from the communication path at a point in time where the application of the backpressure mechanism has ensured that the disconnection of the switch circuitry from the communication path occurs without compromising a communication protocol used to control traffic flow over the communication path.

The point at which the deactivation process is performed can be varied dependent on implementation. Whilst in one example implementation the deactivation process may not be initiated until the transfer operation has fully completed, in another example implementation the deactivation process is initiated at a slightly earlier point. In particular, in one example implementation the switch circuitry is arranged to initiate the deactivation process when the buffer holding the evicted write data reaches an emptiness threshold, which in one example implementation is reached before the buffer is completely empty. The backpressure mechanism is then maintained until the buffer is empty. This can prevent a race condition occurring between a device signalling that all buffered evictions have been issued back to the first memory, and a new write eviction command being received by the switch circuitry. In particular, the backpressure mechanism prevents any such new write evictions being accepted between the point at which the buffer reaches the emptiness threshold and the point at which the buffer is actually empty.

Particular examples of the present technique will now be described with reference to the figures.

FIG. 1 is a block diagram of an example system in which the techniques described herein may be utilised. As shown in FIG. 1, a System-on-Chip (SoC) 10 has a subsystem 15 in which is provided processing circuitry 20 and an associated cache hierarchy 25. The cache hierarchy 25 may contain one or more levels of cache that are used to cache a subset of the data and/or instructions held in memory. Whilst the processing circuitry 20 may comprise a single processing unit, it may alternatively comprise multiple processing units. At least some of those processing units may have their own local cache, and in addition the cache hierarchy may comprise one or more levels of shared cache that may be used by the processing units.

The subsystem 15 is connected via an interconnect 30 to on-chip memory 50 and to interface component(s) 40 used to connect to an off-chip memory 45. Also provided is transfer circuitry 55, which may for example take the form of a direct memory access (DMA) unit that can perform bulk transfer operations on behalf of the processor subsystem 15.

A system address map 70 is provided that is used to map addresses specified by access commands issued by the processing subsystem 15 into locations within the system memory, with the commands then being routed through the interconnect to the appropriate memory. The system memory includes at least the off-chip memory 45 and the on-chip memory 50, but may in addition include other components of memory not shown within FIG. 1. Both the off-chip memory and the on-chip memory may be formed of single memory devices, or may alternatively be composed of multiple devices that collectively form the off-chip memory and the on-chip memory. Various technologies may be used to implement the memory devices forming the various memory components of the memory system. However, in the example of FIG. 1 the on-chip memory may for example take the form of static random access memory (SRAM), whilst the off-chip memory may for example take the form of double data rate (DDR) memory.

A communication path 75 is provided by the interconnect circuitry 30 as a path to the off-chip memory 45, and that communication path may be connected directly to the one or more interface components 40, or may be coupled to those components via an optional further interconnect 80.

During a normal mode of operation, the processing circuitry 20 may be performing various operations that require access to both the off-chip memory 45 and the on-chip memory 50. During such a mode of operation the processing circuitry may make use of the entire system address space, or at least a significant proportion of it, but when the processing circuitry is operating in one or more particular modes of operation, for example a low power mode, it may be the case that significant parts of the system address space are not used. For instance, it may be that only a subset of the memory locations within the off-chip memory 45 will be accessed by the processing circuitry 20 when operating in a low power mode of operation. Further, in many implementations it can be the case that all, or at least certain parts, of the on-chip memory are also not utilised by the processing circuitry 20 when operating in a low power mode of operation.

By way of specific example, in a communication device multiple communication channels may be established for use by the processing circuitry during a normal mode of operation. For example, a mobile phone or a router modem may have multiple defined channels of communication. However, it is often the case that there are significant periods of time where no data is sent using such communication devices, and in such instances a large proportion of the channels are not utilised. It is often the case that the on-chip memory 50 is used to provide buffers for the various channels, and accordingly the allocated space in the on-chip memory used to provide the buffers for data channels that are idle whilst the processing circuitry is in the low power mode of operation will hence be unused during such modes of operation. In some instances, it may be considered appropriate to power off at least parts of the on-chip memory during such low power modes of operation in order to conserve power consumption. However, with regard to the off-chip memory, as mentioned earlier there will typically still be code and/or data that needs to be accessed, and accordingly it will typically be the case that the interface components 40 will remain powered up, to allow access to the off-chip memory. Whilst in principle steps could be taken within the system to alter the system address map 70 when in the low power mode of operation so that all of the required accesses take place with respect to on-chip memory, this is a time intensive and costly task, as it typically involves flushing the caches and reconfiguring address translation mechanisms used within the system, such as translation lookaside buffers (TLBs).

However, in accordance with the techniques described herein, such time intensive and costly procedures are avoided by providing a mechanism that allows the off-chip memory 45 to be virtualised whilst the processing circuitry is operating in a low power mode of operation, in a manner that is architecturally invisible and essentially transparent to the processing subsystem 15. In particular, as will be discussed in more detail herein, switch circuitry 65 is provided that is coupled to selection circuitry 60 provided within the communication path 75, and when the processing circuitry is in a low power mode of operation, the switch circuitry can be activated in order to be connected into the communication path and intercept access commands being routed to the off-chip memory. Those access commands can then be re-routed by the switch circuitry via path 85 to on-chip memory, in the example implementation of FIG. 1 path 85 allowing communication with the on-chip memory 50 via the interconnect 30.

Once the switch circuitry has been activated, then the required subset of content of the off-chip memory 45 that needs to be accessed by the processing circuitry whilst in the low power mode of operation can be migrated from the off-chip memory 45 to unused locations within on-chip memory 50 in order to establish a copy 52 of that content from the off-chip memory. The activities of the processing circuitry 20 do not need to be significantly stalled during this process, and no cache flushing or TLB reconfiguration is required. Instead, the processing circuitry 20 continues to issue access commands as normal, and the system address map 70 is unaltered and hence continues to map the addresses to locations within the system address space in the usual manner. Accordingly, access commands targeting the off-chip memory 45 will continue to be output onto the communication path 75, but will now be intercepted by the switch circuitry 65 and re-routed via the path 85 to the on-chip memory 50 in order to access the corresponding location within the portion 52 of the on-chip memory that has been allocated for holding the DDR memory content. The switch circuitry maintains a record of the locations used within the on-chip memory to store data of corresponding locations in the off-chip memory, which is referenced when intercepting and re-routing individual access commands.

In addition to the techniques described herein being architecturally invisible, and hence not requiring the time-demanding operations that might otherwise be required to migrate data to on-chip memory (such as cache flushing, reconfiguring of TLBs, altering of the system address map, etc), the technique also does not require significant stalls of the components with the SoC 10, since the switch circuitry 65 can keep track of the progress of the transfer operation of data from the off-chip memory to the on-chip memory under control of the DMA 55, and handle individual access commands accordingly. Further, the techniques described herein do not affect the critical paths and latency to the off-chip memory, typically requiring only the insertion of a 2:1 multiplexer into the memory access paths.

Due to the fact that the process is implemented in an architecturally invisible manner, it is possible that the cache hierarchy 25 may still hold data for addresses within the off-chip memory 45 that are outside of the address range or address ranges used by the processing circuitry when in the low power mode of operation. As a result, during normal cache maintenance operations it is possible that data will be evicted from the cache hierarchy, resulting in the issuance of write access commands via the interconnect 30 and on to the communication path 75 targeting various addresses within the off-chip memory 45. These will be intercepted by the switch circuitry 65, and if they relate to addresses within the expected address range or address ranges used by the processing circuitry in the low power mode of operation, those commands can be routed to the relevant locations within the portion 52 of the on-chip memory 50. However, if they relate to addresses outside of the expected address range, then this is still allowed behaviour, since it is expected that such write access commands result from the earlier-mentioned cache eviction activity. In order to ensure that such data is not lost, an eviction buffer 54 can be allocated (for example within available space of the on-chip memory 50) for storing such write data, along with an associated indication of the address within the off-chip memory to which that data needs to be written.

In due course, when the above memory virtualisation process is ended, and accordingly it is desired to disconnect the switch circuitry from the communication path 75, then the DMA 55 can again be utilised to transfer back to the off-chip memory 45 the DDR content stored within the portion 52 of the on-chip memory 50. In addition, during that transfer operation, the contents of the eviction buffer 54 can also be written back to the relevant locations within the off-chip memory 45, such that by the time the switch circuitry is disconnected, the off-chip memory 45 then has stored all of the correct content associated with the off-chip memory.

Whilst the switch circuitry is activated, and the once the above transfer operation has been performed, a memory release control signal can then be issued in respect of the off-chip memory 45. A power controller for the system will then receive that memory release signal and, provided no other system components require access to the off-chip memory 45, may then respond to such a signal by placing the off-chip memory into a low power mode. This may typically be a data retention mode sufficient to ensure that the contents of the off-chip memory 45 are not lost. In particular, it will be noted that whilst a copy of the relevant content that the processing circuitry is expected to access during the low power mode has been made within the on-chip memory 52, there will still be valid content stored in the off-chip memory that will need to be available when the processing circuitry subsequently exits the low power mode, and accordingly it is important that no data is lost from the off-chip memory 45. Nevertheless, such power retention modes of operation typically result in significantly reduced power consumption by the off-chip memory, and hence can give rise to significant power consumption savings. Further, in some instances, for example where flash memory is used as the off-chip memory, it would be possible to power off the off-chip memory without losing data, hence allowing further power savings.

It is also of note that the interface components 40 may be able to be powered down whilst the processing circuitry is in the low power mode, since all accesses to the off-chip memory 45 will be intercepted by the switch circuitry 65 and routed to the on-chip memory 50, and accordingly the interface components 40 will not be used. This can also give rise to significant power consumption savings.

Figure 2:
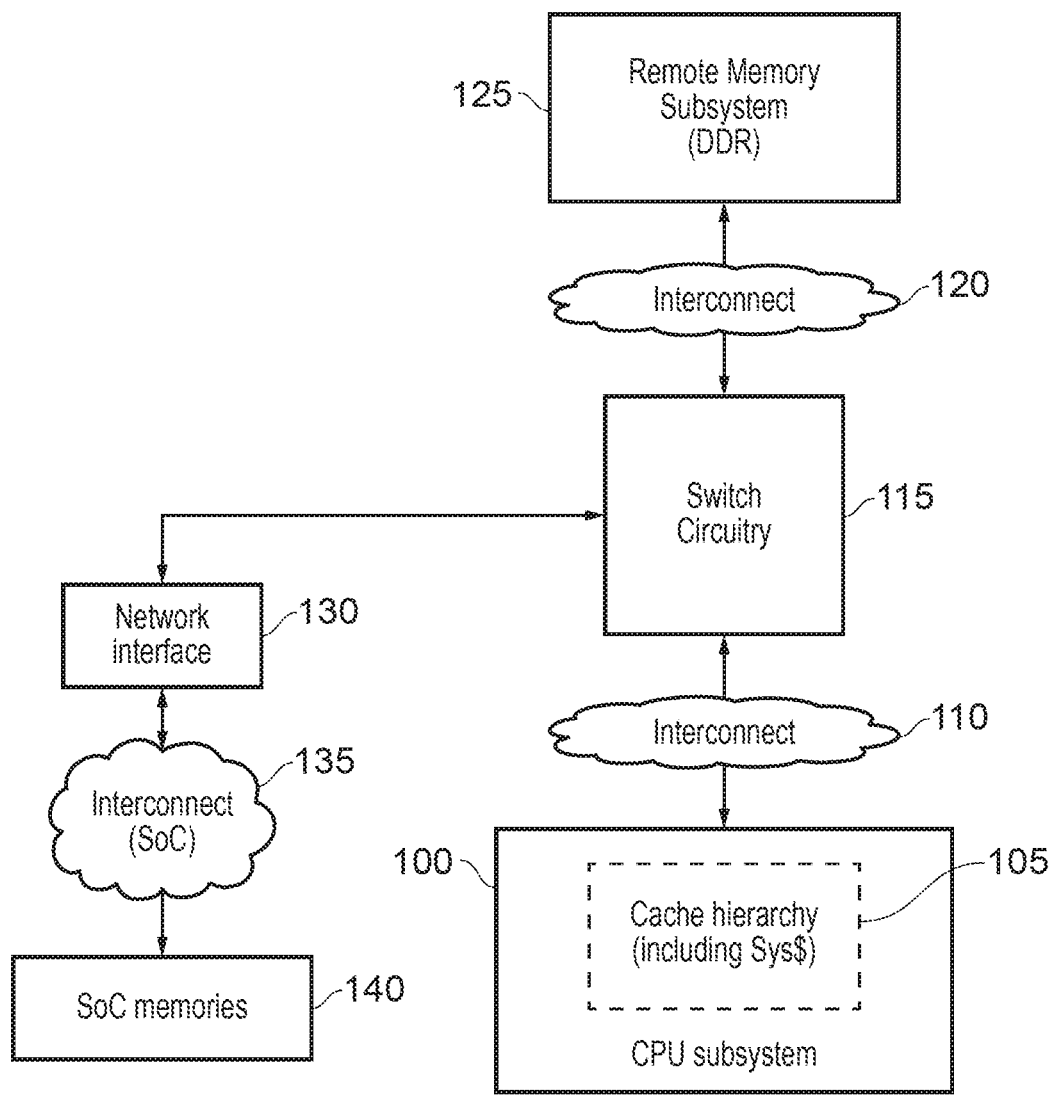
FIG. 2 schematically illustrates the use of the switch circuitry described herein, in accordance with one example arrangement.

FIG. 2 is a further block diagram schematically illustrating the use of the switch circuitry in accordance with the techniques described herein. A central processing unit (CPU) subsystem 100 including a cache hierarchy 105 (which may include the system level cache shared by multiple CPUs) is arranged to issue access commands to a remote memory subsystem 125 over a communication path. The remote memory can take a variety of forms, but as discussed earlier with reference to FIG. 1 may for example be off-chip memory that is relatively slow, and less energy efficient, to access than on-chip memories. The communication path may provide a direct connection between the CPU subsystem 100 and the remote memory 125, or may be coupled to those components via optional interconnect circuits 110, 120.

As shown in FIG. 2, the switch circuitry 115 can be connected into the communication path in order to intercept access commands issued from the CPU subsystem 100 to the remote memory 125, and to redirect those access commands to local memory, such as the SoC memories 140 shown in FIG. 2. When accessing SoC memories, such re-routing of the commands may involve routing those commands via a network interface 130 on to the SoC level interconnect 135 from where those access commands are directed to the SoC memories 140.

The switch circuitry is connected to the link between the cache hierarchy and external memory. This link can be anywhere in the SoC provided that it cannot be bypassed to other active paths, as it is necessary for the switch to see all accesses and respond coherently. In particular, the switch needs to see all traffic between the cache hierarchy and off-chip memory. It should be noted however that there may be other traffic within the system that is not passing between the cache hierarchy and the off-chip memory, and does not need to be observed by the switch circuitry.

Figure 3A:
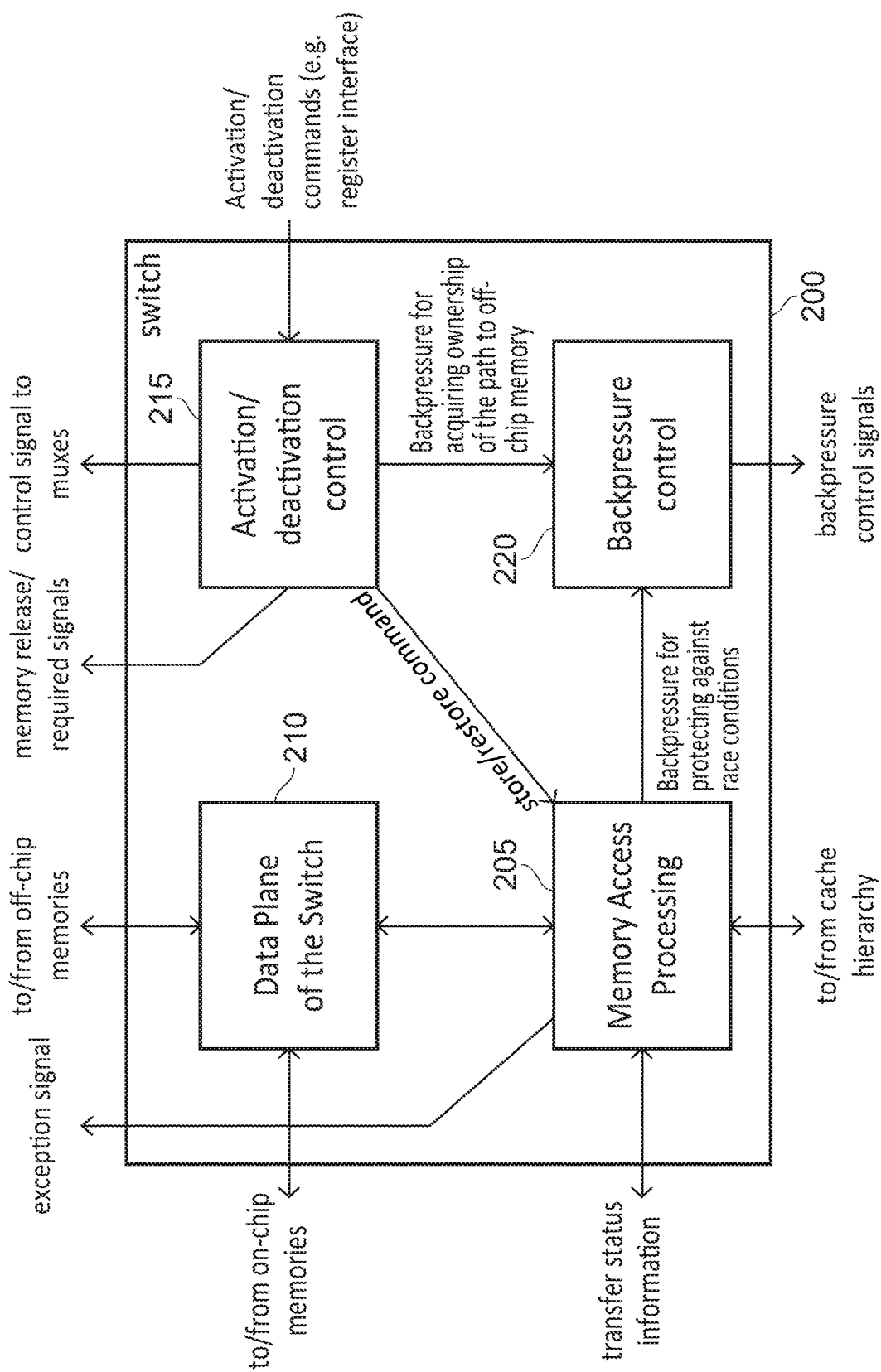
FIGS. 3A and 3B are block diagrams illustrating the switch circuitry in more detail, in accordance with one example arrangement.

FIG. 3A is a block diagram illustrating components that may be provided within the switch circuitry. In this example implementation the switch circuitry 200 contains a memory access processing block 205 that communicates to and from the cache hierarchy 105 of the CPU subsystem 100. This block 205 performs various control functions as will be discussed in more detail with reference to FIG. 3B. As shown in FIG. 3A, the memory access processing block 205 is coupled to the data plane of the switch 210, which can be used to direct traffic either to and from the off-chip memories, or to and from the on-chip memories, based on the signals that it receives from the memory access processing block 205.

The switch is activated and deactivated using the activation/deactivation control block 215 that receives activation and deactivation commands via a suitable mechanism such as a register interface. The activation/deactivation control block 215 can control the various multiplexers provided within the communication path in order to selectively connect and disconnect the switch from that communication path to off-chip memory. It can also issue memory release or memory required signals to a power controller to identify whether access to the off-chip memory is required or not. Further, as shown in FIG. 3A, the activation/deactivation control block 215 can issue store and restore commands to the memory access processing block 205 to control the operations performed by the memory access processing block 205 when establishing virtualisation of the off-chip memory, and when ending virtualisation of the off-chip memory.

As also shown in FIG. 3A, a backpressure control block 220 is provided that can issue backpressure control signals to various gates within the communication path in order to ensure that actions taken by the switch do not compromise the communication protocol employed over the communication path to off-chip memory. In particular, such communication protocols will typically employ handshake signals, and may for example take the form of a request/acknowledge protocol or a valid/ready protocol. Backpressure can be applied at appropriate points by temporarily inhibiting provision of one of the handshake signals, in order to temporarily stop traffic passing over the communication path in order to control acquisition of the communication path by the switch circuitry when the switch circuitry is connected into the communication path, or release of ownership of the communication path when the switch circuitry is disconnected from the communication path. As will also be discussed in more detail later, backpressure may be applied by the backpressure control block 220 in response to signals received from the memory access processing block 205 in order to protect against various race conditions. As will be discussed in more detail later, the memory access processing block 205 can also detect certain events that require the generation of an exception, and can in that instance issue an exception signal to an exception handler provided within the system in order to cause an exception handling routine to be executed to deal with the occurrence of those events.

Once the switch has been connected into the communication path, then a transfer operation will be initiated in order to transfer certain content from the off-chip memory to the on-chip memory, and during that process transfer status information is received by the memory access processing unit 205 in order to keep the memory access processing unit appraised of the current status of the transfer operation. Such transfer status information is also passed to the memory access processing unit during the process of ending virtualisation, at which point transfers are occurring from the on-chip memory back to the off-chip memory, and again the transfer status information is used to keep the memory access processing unit appraised of the status of the transfer operations.

Figure 3B:
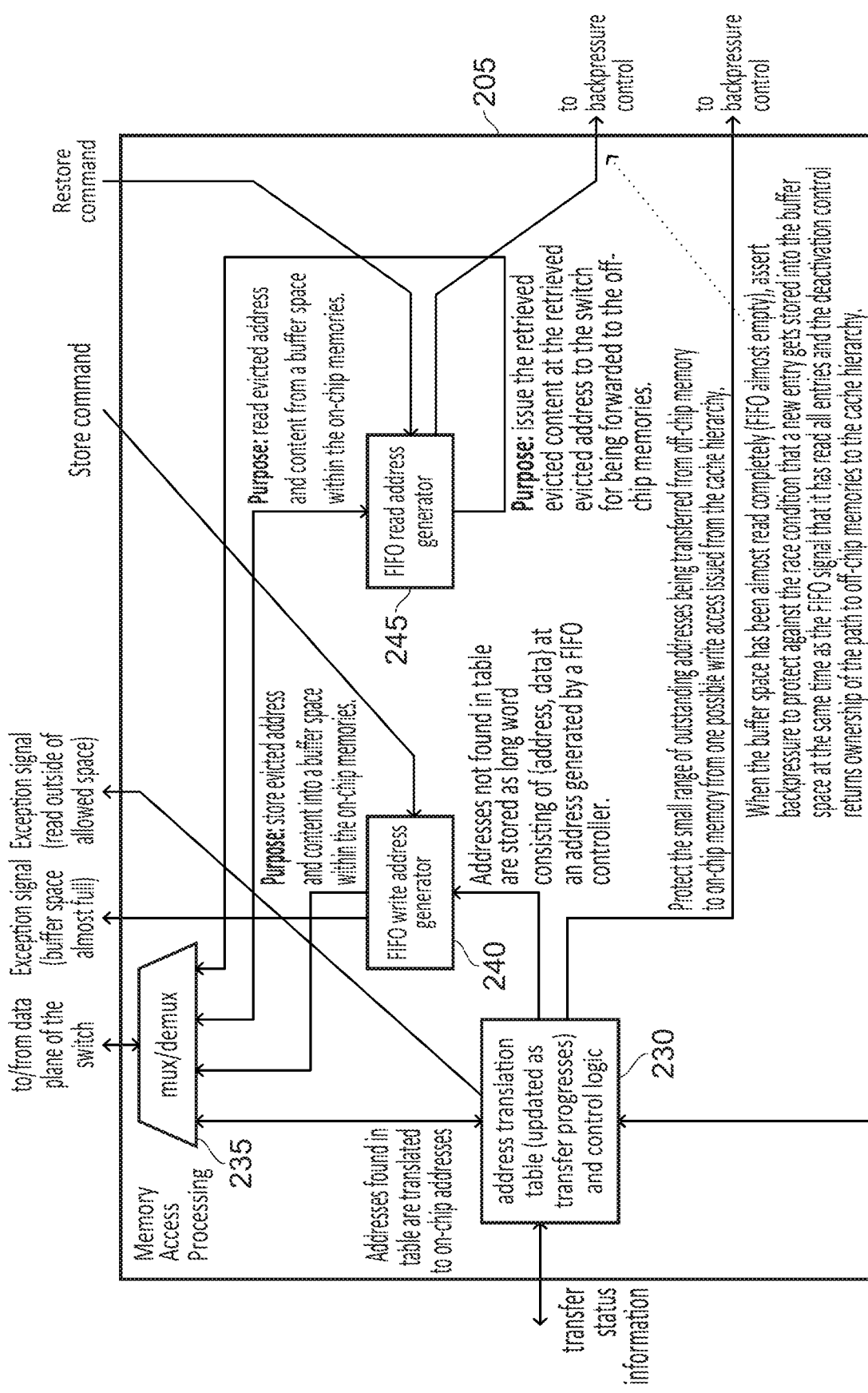

FIG. 3B is a block diagram illustrating in more detail components provided within the memory access processing block 205. The memory access processing block 205 includes an address translation table 230 (also referred to herein as a record) which identifies the subset of locations within the first memory that are to be utilised by the CPU subsystem when in the low power mode of operation, typically these locations being identified by specifying one or more ranges of addresses. For each identified location, the address translation table keeps track of the progress of the transfer operation when the DMA is used to transfer the content from those locations in off-chip memory to the on-chip memory, and for each off-chip memory location keeps a record of the location used in on-chip memory to hold a copy of the content.

When an access command is received from the cache hierarchy 105 of the CPU subsystem specifying an address being monitored by the address translation table 230, and the status of the address translation table entry for that address identifies that the transfer has already taken place, then the address translation table will also identify the corresponding address within the on-chip memory to which the content has been copied, and accordingly will forward on the access command to the multiplexer/demultiplexer 235 specifying the address in the on-chip memory. The signal will then be propagated to the data plane of the switch 210, where that command will then get routed to the on-chip memory.

When the switch is activated, then a store command is issued to a FIFO write address generator 240 from the activation/deactivation control block 215, and in addition buffer space will be allocated within an eviction buffer in the on-chip memory. When the address translation table 230 detects that it has received a write access command that is targeting the first memory, but at an address not within the subset of addresses being tracked by the address translation table, then it is assumed that this is due to a write eviction from the cache hierarchy, and that access command is routed to the FIFO write address generator 240. The FIFO write address generator then generates a command identifying the eviction buffer as a target, in one embodiment the eviction buffer being arranged as a FIFO buffer so that each new access to the FIFO buffer causes the content provided in that command to be stored into the top entry of the FIFO. The FIFO write address generator generates a write access command to the FIFO that specifies both the evicted content specified in the original write access command received by the address translation table, and the indicated address within the first memory (i.e. the off-chip memory) to which that evicted content is to be written. In one example implementation that is achieved by creating a command specifying a long word consisting of both the content and the address information. That generated command by the write address generator 240 is then routed via the multiplexer/demultiplexer 235 to the data plane of the switch, where it is routed to the on-chip memory for storing within the FIFO buffer.

If the address translation table 230 receives an access command specifying an address that is being tracked by the address translation table, but the entry indicates that the transfer of the content of that address has not yet taken place, then in one example implementation a signal is issued from the address translation table to the backpressure control block 220, in order to cause a backpressure control signal to be issued that temporarily prevents acceptance of the currently asserted access command. Once the required transfer has taken place, and the address translation table has hence been updated, then the backpressure control signal can be released, allowing the new command to be accepted, and at that point the address translation table will convert the address into the corresponding address within the on-chip memory, and route the access command on via the multiplexer/demultiplexer 235 to the data plane of the switch 210.

The FIFO write address generator 240 can keep track of the utilisation of the FIFO buffer. In some implementations it may be the case that the allocated size of the FIFO buffer is not guaranteed to be large enough to enable all write evictions to be stored, and in that case the FIFO write address generator 240 may be arranged so that when the FIFO is almost full, an exception signal is issued to an exception handler to cause an exception handling routine to be executed. This could for example cause the virtualisation process to be ended, at which point all of the content that has been stored within the on-chip memory that is in fact destined for the off-chip memory will be transferred back under DMA control to the off-chip memory, resulting in the FIFO buffer being drained in order back to the off-chip memory. In an alternative implementation, the exception handling routine may just cause the FIFO buffer to be drained, but to then resume the virtualisation process with the FIFO buffer now empty, and with the original transferred content from the off-chip memory still residing in the on-chip memory.

Whilst write access commands issued to addresses within the first memory that are outside of the subset of addresses being monitored by the address translation table 230 are considered allowable, since they are assumed to result from a write eviction from the cache hierarchy 105, it is not expected that read commands should be issued to access such addresses. In particular, the address range(s) in the address translation table will have been established based on an understanding of the allowable addresses that can be accessed by the processing circuitry when in the low power mode. The switch circuitry may, for example, be configured with this address range information at boot time, or alternatively this address range information will be programmed into the address translation table 230 of the memory access processing block 205 prior to the processing circuitry entering the low power mode. Accordingly, if a read access is issued to an address outside of the address range or ranges being monitored by the address translation table, this is treated as an error, and results in the generation of an exception signal from the address translation table to an exception handler. It will be appreciated that there are a variety of ways in which this error can be handled, depending on the particular implementation.

When the virtualisation process is to be ended, then the transfer operation is reversed in order to restore back to off-chip memory the content of the off-chip memory that has been stored within the on-chip memory, and again the address translation table can monitor this process, and update its record as transfer status information is received from the DMA unit indicative of the addresses for which the data has been restored. However, in addition it is also necessary to empty the FIFO buffer that has been used for write eviction data, and to achieve this a restore command is issued from the activation/deactivation control block 215 to a FIFO read address generator 245. The FIFO read address generator 245 is arranged to read the evicted address and content information from the buffer space within the on-chip memories, and to then issue write access commands specifying the retrieved evicted address and the retrieved evicted content to the data plane of the switch 210 in order to cause the data to be forwarded to the off-chip memories for storage at the appropriate address.

When the FIFO buffer space has been almost emptied, the read address generator can then assert a backpressure signal to the backpressure control block 220, in order to protect again the race condition where a new entry gets stored into the buffer at the same time as the FIFO signals that it has emptied all of its entries and the deactivation control process returns ownership of the path to off-chip memories to the cache hierarchy by disconnecting the switch. In particular, through use of the backpressure control, this can avoid a new write eviction signal being accepted whilst the remaining entries of the FIFO are emptied, with that eviction then being handled once the FIFO has been emptied.

Figure 4:
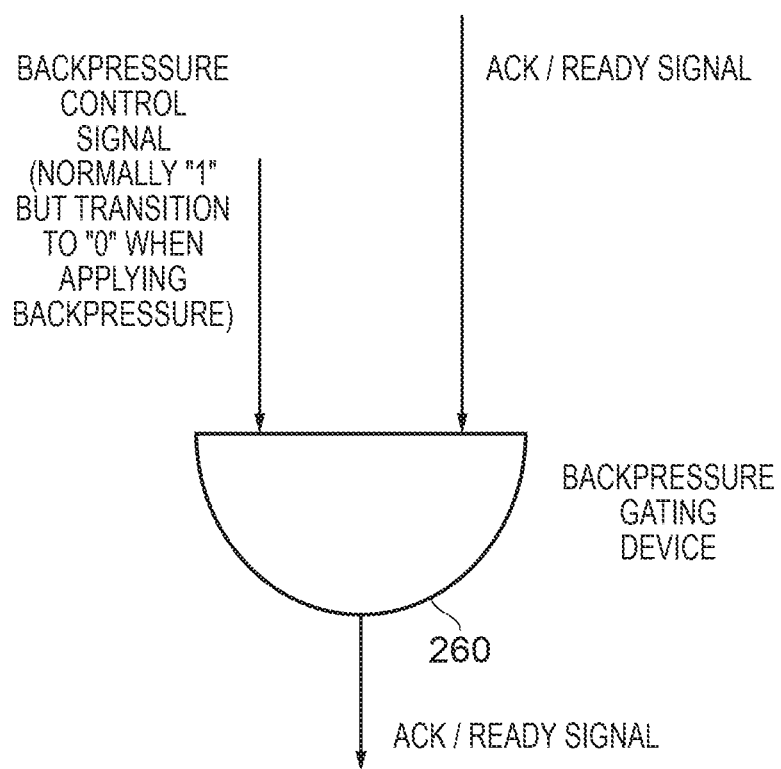
FIG. 4 illustrates a form of backpressure gating device that may be used in one example implementation.

The backpressure control signals issued by the backpressure control block 220 can be used in a variety of ways within the communication path. However, as will be discussed in more detail with reference to FIG. 5, various backpressure gating devices can be inserted within the communication path that are controlled by such backpressure control signals. In one example, the backpressure gating device can take the form of an AND gate 260 as shown in FIG. 4. In particular, the AND gate 260 can be inserted in one of the handshake signal paths in the communication path, for example to intercept and propagate acknowledgement or ready signals. The backpressure control signal can normally be asserted at a logic one level, but can be transitioned to a logic zero level when applying backpressure, to effectively force the output of the backpressure gating device to a logic zero value, and hence inhibit the acknowledgement/ready signal for a period of time.

The timing of use of the backpressure control signal may be controlled talking into account the communication protocol utilised. In particular, the backpressure control signal's value as applied to the AND gate 260 needs to change at a point in time where that change will not compromise the communication protocol, and hence there might be a slight delay between the backpressure control signal being asserted by the backpressure control block 220, and that asserted backpressure control signal being applied to the input of the backpressure gating device 260.

Figure 5:
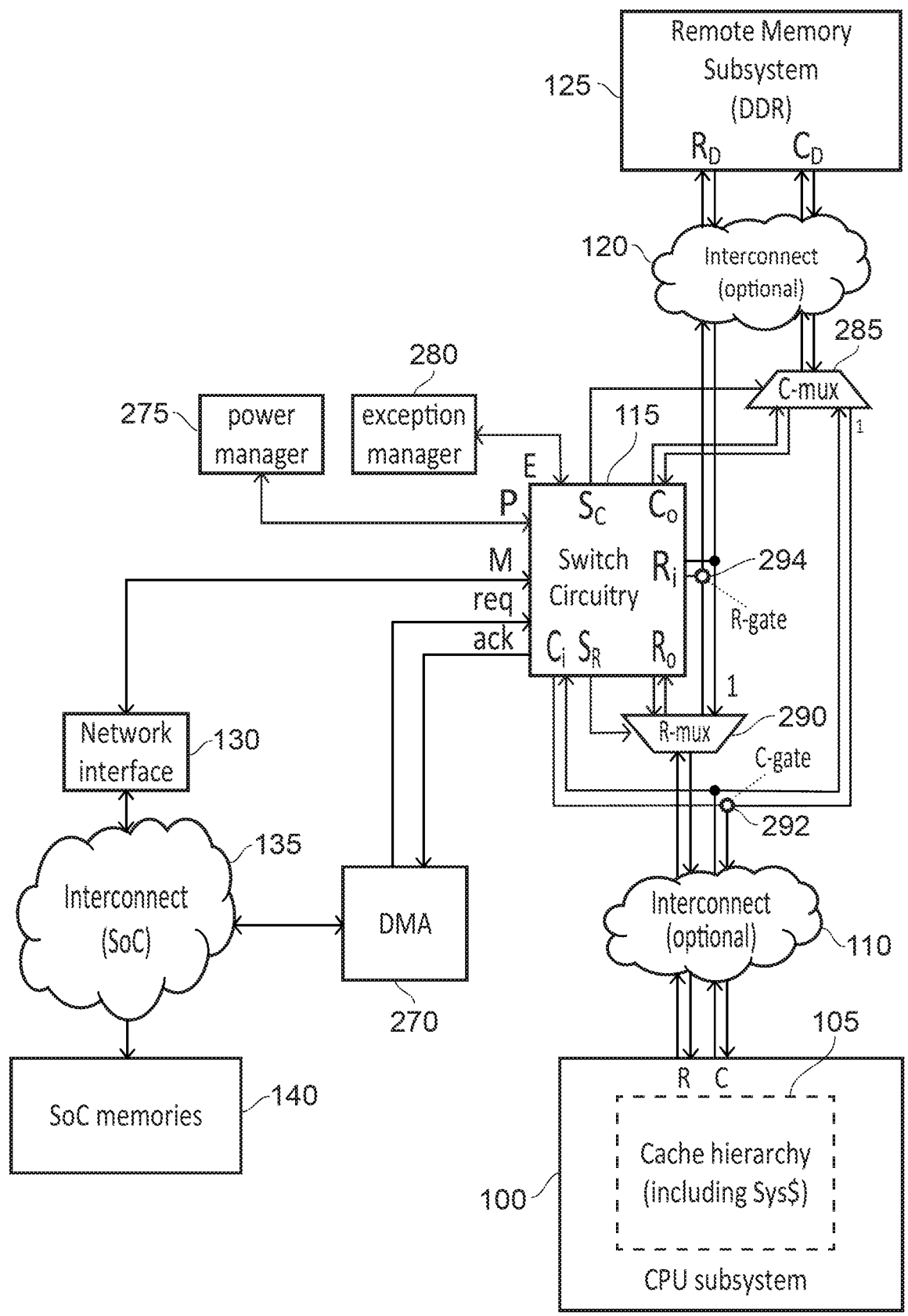
FIG. 5 is a diagram illustrating in more detail how the switch circuitry of FIG. 2 is used, in accordance with one example implementation.

FIG. 5 is a diagram illustrating in more detail the system of FIG. 2. In particular, FIG. 5 shows the provision of command (C) and response (R) channels within the communication path between the cache hierarchy 105 and the remote memory subsystem 125. As can be seen in the figure, for each of the command channel and the response channel, there is a primary path which bypasses the switch circuitry 115 and a secondary path which is routed through the switch circuitry 115. Selection circuitry is controlled by the switch circuitry, and takes the form of the two multiplexers 285, 290 which are inserted within the command channel and the response channel, respectively.

In addition, FIG. 5 shows a DMA unit 270 that is used to perform the transfer operations between the remote memory subsystem 125 and the SoC memories 140 during the process of entering memory virtualisation and ending memory virtualisation. It should be noted that the performance of the transfers by the DMA unit can be implemented in a variety of ways, and it is not a requirement that the actual transfer traffic passes through the switch circuitry provided that the switch circuitry has visibility of the transfers, and can accordingly update its address translation table as the transfers take place.

The switch circuitry also is able to communicate with a power manager block 275 and an exception manager block 280. The power manager block 275 is able to control the power mode of various components within the system, and may for example be arranged to place the remote memory subsystem 125 into a power retention state, and to selectively turn off components such as the interface components that provide a connection to the remote memory subsystem 125. Whilst the exception manager 280 is shown as a single entity in FIG. 5 for ease of illustration, and indeed could in some implementations be a separate physical entity within the system, in an alternative implementation the exception manager functionality could be distributed across multiple communicating entities within the system.

Figure 6:
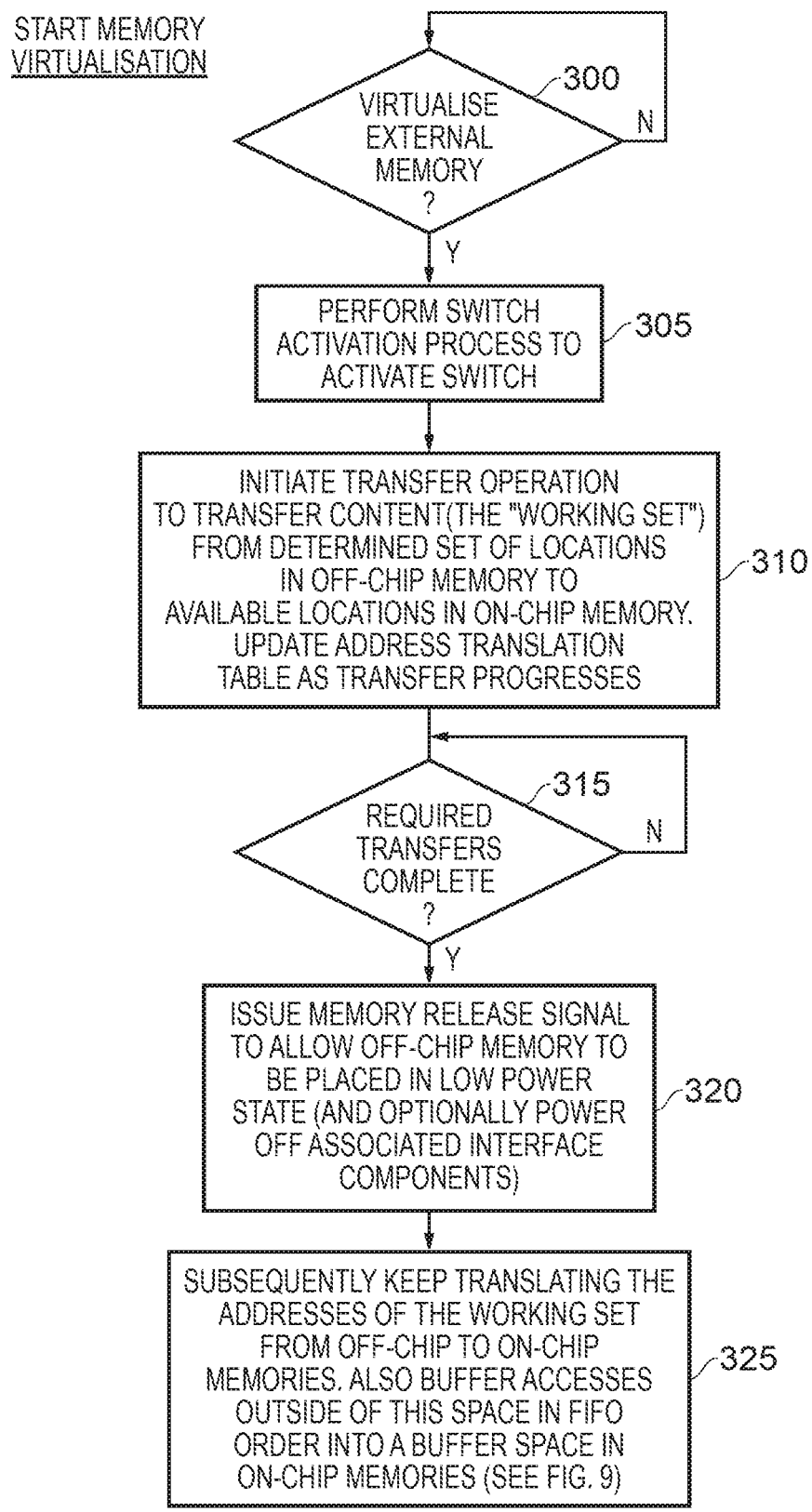
FIG. 6 is a flow diagram illustrating steps performed when starting memory virtualisation, in accordance with one example implementation.

FIG. 6 is a flow diagram illustrating the steps performed within the system of FIG. 5 in order to start memory virtualisation. At step 300, it is determined whether virtualisation of the external memory, i.e. the remote memory subsystem 125, is to be performed. The decision to virtualise external memory can be implemented in a variety of ways, but in one example involves the provision of an activation command to the activation/deactivation control block 215 of the switch circuitry. This command may originate from a number of locations within the system, and may for example be a command issued by the CPU subsystem 100 when the processing circuitry within the CPU subsystem is entering a low power mode of operation. Alternatively, other mechanisms may be used, for example a timer may be used that causes the activation command to be triggered once the CPU subsystem has been in a low power state for a certain period of time. More generally any suitable stimulus can be used to trigger virtualisation, but will typically originate as a result of activities performed within the CPU subsystem 100.

Once it has been decided to virtualise external memory, then the process proceeds to step 305 where a switch activation process is performed in order to activate the switch. The goal of the switch activation is to gain ownership of the communication path between the cache hierarchy 105 and the DDR memory 125, and insert the switch into that link. When performing the switch activation process, backpressure is exerted on the command channel through the C gate 292 by suppressing the handshake signal until any outstanding accesses seen at the input $C_i$ of the switch circuitry 115 have been issued to the output $C_o$ of the switch circuitry, and at that point the switch control output $S_c$ is set to zero to cause the multiplexer 285 to select the output $C_o$ of the switch circuitry in preference to the primary input path. This process gains ownership of the forward bus providing command, address, and write data from the cache hierarchy 105 to the remote memory subsystem 125. In essence, this mechanism exerts backpressure for one forward bus cycle in order to take ownership of the bus from the subsequent clock cycle.

With regard to the response channel, then when all of the outstanding responses being issued to the CPU subsystem 100 have been observed at the switch input $R_i$, then the multiplexer control signal $S_R$ is set equal to zero in order to cause the multiplexer 290 to select the output $R_o$ from the switch circuitry rather than the primary response channel path. This process gains ownership of the backward bus providing read and non-posted write responses. In essence, the mechanism waits until the backward bus becomes idle before taking ownership.

Following step 305, then a transfer operation is initiated at step 310 to transfer a determined set of content (also referred to herein as the working set) from an identified set of locations in the off-chip memory to available locations in the on-chip memory. As discussed earlier, the switch circuitry will be configured with the relevant address range or address ranges identifying the locations in the off-chip memory that will be used by the CPU subsystem when in the low power mode of operation, and will cause the content to be moved from the locations of the off-chip memory identified by those addresses to available locations in the on-chip memory using a suitable transfer mechanism such as the DMA unit 270.

As discussed earlier, the switch circuitry maintains an address translation table 230 for the relevant addresses, which is updated as the transfer operation progresses so that addresses targeting the DDR memory are remapped so that they are no longer routed to the command input $C_D$ of the DDR memory 125, but instead are output on the bus M via the network interface 130 and the interconnect 135 to locations in the SoC memory 140 that are otherwise unused whilst the CPU subsystem is in the low power mode of operation. Any suitable data transfer mechanism can be used, but in one example implementation the DMA unit 270 is used, and employs a flow control request/acknowledge protocol via which the switch circuitry can keep track of the progress of the transfer operations and update its address translation table accordingly. It should be noted that throughout this process, these transfers are entirely invisible to the CPU subsystem 100, and no changes are made to the way in which the CPU subsystem addresses system memory. Indeed, the system address map 70 remains unchanged, and accordingly the CPU continues to issue addresses targeting locations in the DDR memory 125, and has no knowledge of the redirection of those requests to locations within the SoC memory 140.

At step 315, it is determined whether all of the required transfers are complete, and once all the required transfers are complete, then the switch circuitry can issue at step 320 a memory release signal over the bus P to the power manager 275. Issuance of this release signal allows the off-chip memory to be placed into a low power state, with the ultimate decision as to whether to change the power state of the DDR memory being taken by the power manager based on knowledge of whether any other components within the system are seeking to use the remote DDR memory at the current time. If no other components are using the DDR memory, then the power manager will transition the DDR memory into a power retention state. In addition, irrespective of whether the DDR memory is transitioned into a low power state or not, further power consumption benefits may be achieved by powering off the associated interface components provided on the SoC to allow the CPU subsystem 100 to communicate with the remote memory.

As indicated by step 325, thereafter the switch continues to translate the addresses of the working set from off-chip to on-chip memories. Further, if any write data commands are issued that target addresses within the DDR memory 125, but those addresses are outside of the virtualised address range, then those accesses are buffered in FIFO order in a buffer provided within the SoC memory space, as will be discussed in more detail later with reference to FIG. 9. Both the address and the data to be written are stored within entries of the buffer so that that information can be retrieved later during a memory virtualisation end process in order to restore that content into the DDR memory.

Figure 7:
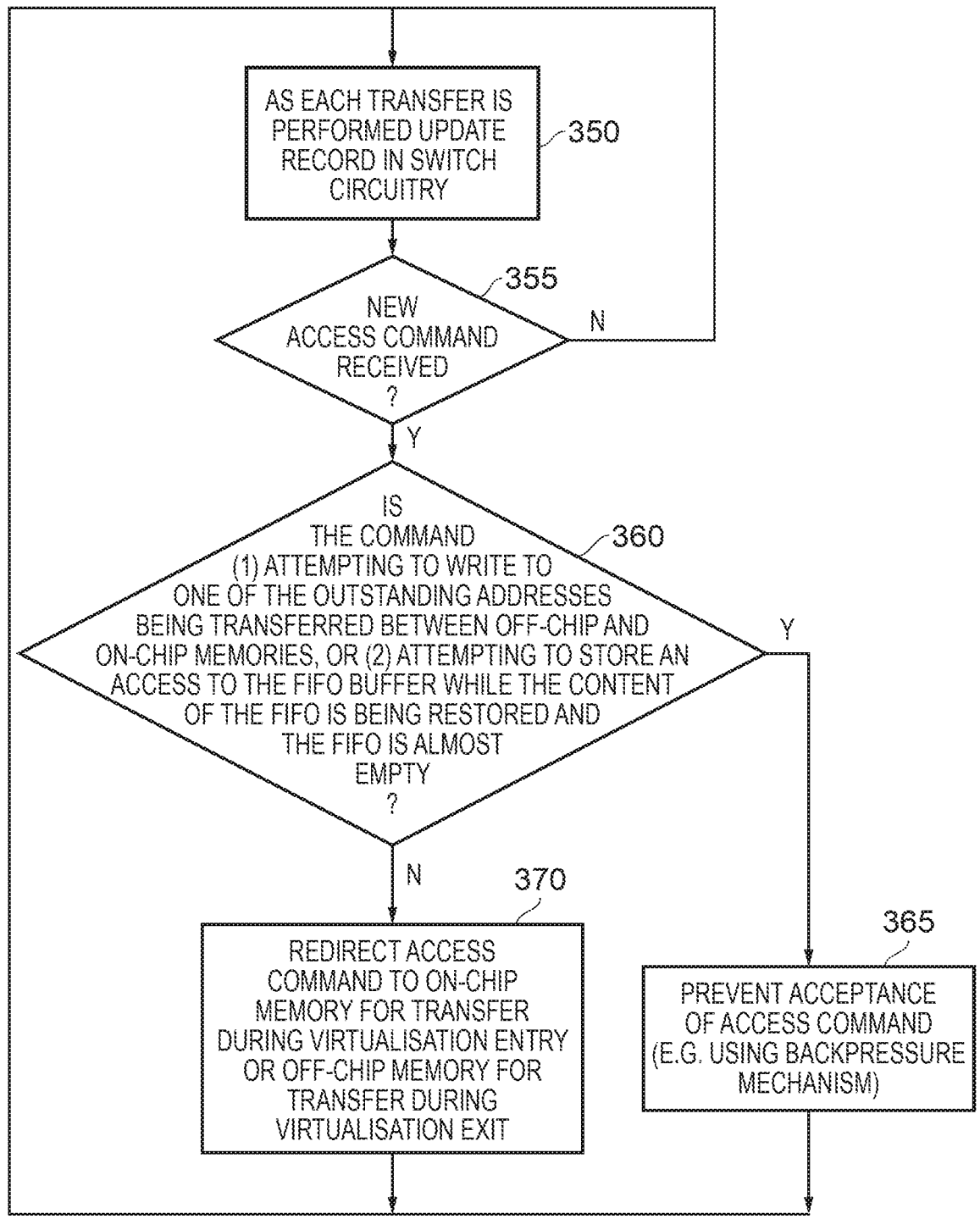
FIG. 7 is a flow diagram illustrating steps performed in order to implement a transfer operation, in accordance with one example implementation.

FIG. 7 is a flow diagram illustrating in more detail the transfer operation performed at step 310 of FIG. 6. At step 350, as each transfer is performed the record in the switch circuitry is updated. In particular, with reference to the earlier-discussed FIG. 3B, transfer status information can be provided to the address translation table 230 of the switch, and used to update the address translation table information to identify those addresses that have now been remapped into the SoC memory. It should be noted that the same process can also be employed when exiting the virtualisation process in order to track the transfer of information from the SoC memory back to the DDR memory.

At step 355 it is determined whether a new access command has been received from the CPU subsystem, and whilst this is not the case the transfer merely continues to be monitored at step 350. However, if a new access command is received at step 355, it is then determined at step 360 if the command is attempting to write to one of the outstanding addresses being transferred between off-chip and on-chip memories. During the transfer operation performed on entering the virtualisation mode of operation, the test will be whether the command is attempting to write to one of the outstanding addresses being transferred from the off-chip to the on-chip memory, whereas during the virtualisation exit procedure the check will be whether the command is seeking to write to one of the outstanding addresses being transferred from the on-chip memory to the off-chip memory. The address translation table provided by the switch circuitry is arranged to keep track of the transfers performed so that any received access command can be directed to the appropriate memory depending on the status of the transfer operation. Keeping the address translation table updated as the transfer progresses can be readily accommodated. For instance, in one example implementation, the address translation table may include adder circuitry to add an offset to a range of addresses, where the offset is set to account for the difference between a location in the off-chip memory and its corresponding allocated location in the on-chip memory, and the range of addresses is updated as the transfer operation proceeds to account for the addresses whose content has been transferred.

As also indicated in step 360, and as will be discussed in more detail later with reference to FIG. 11, during the process of restoring the contents from the SoC memory to the DDR memory when virtualisation is to be ended, it can also be detected at step 360 if there is an attempt to store an access to the FIFO buffer (as mentioned earlier this will typically be due to eviction of data from the cache hierarchy) at a point in time where the content of the FIFO is being drained in order to restore that content to the DDR memory, and the FIFO is almost empty.

If any of the conditions tested for in step 360 is determined to be present, then at step 365 acceptance of the access command is prevented temporarily, typically using the backpressure mechanism discussed earlier. However, if none of those conditions are present, then at step 370 the access can be redirected to the on-chip memory in situations where the transfer process is taking place during virtualisation entry, or to the off-chip memory in situations where the transfer is taking place during virtualisation exit.

Figure 8:
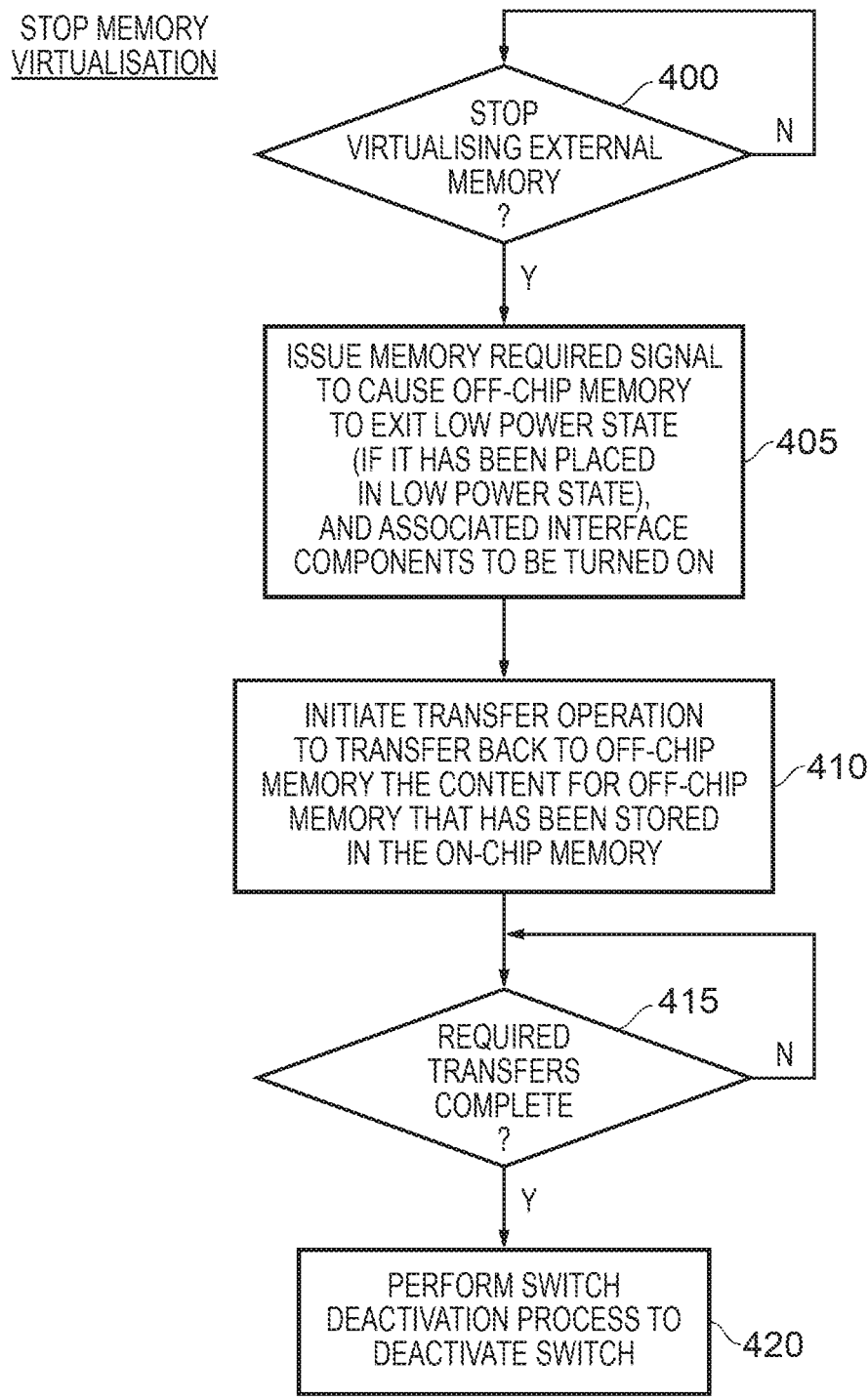
FIG. 8 is a flow diagram illustrating steps performed when it is determined that memory virtualisation is to be stopped, in accordance with one example implementation.

FIG. 8 is a flow diagram illustrating the process performed when it is determined that memory virtualisation should cease. At step 400, it is determined whether to stop virtualising external memory. This decision can be implemented in a variety of ways, but will typically be triggered by a deactivation command sent to the activation/deactivation control block 215 of the switch circuitry, for example due to the CPU subsystem exiting the low power mode, and accordingly needing to have full access to the DDR memory.

When it is determined that the virtualising of external memory should cease, then the switch circuitry issues a memory required signal to the power manager 275 at step 405, which causes the off-chip memory to be exited from the low power state assuming it is currently in that low power state. Further, the associated interface components can be turned back on if they had previously been turned off.

At step 410, a transfer operation is initiated in order to transfer back to off-chip memory the content for off-chip memory that has been stored in the on-chip memory. This includes both the working set of content, and any evicted write data in the eviction buffer. Again, this process can be managed in a variety of ways, but in one example implementation involves use of the DMA unit 270, with the status information from the DMA unit being used to update the address translation table 230 within the switch as transfers proceed. With regard to the eviction buffer contents, then as discussed earlier with reference to FIG. 3B, a FIFO read address generator 245 within the switch can be used to recreate the required write transfers to the DDR memory when draining the contents of the FIFO buffer. Whilst the timing of the draining of the FIFO buffer and the transfer of the working set of data from the on-chip memory to the DDR memory can be varied dependent on implementation, in one example implementation the working set is transferred under DMA control back to the DDR memory first, and thereafter the FIFO read address generator is used to drain the eviction buffer.

At step 415 it is determined whether the required transfers are complete, and if so a switch deactivation process is performed at step 420 to deactivate the switch. Whilst in one example implementation the test at step 415 may actually wait until the FIFO buffer has been completely drained before determining that the transfers are complete, in an alternative implementation, this trigger will be issued slightly earlier, when the eviction buffer is almost empty but not quite empty, as will be discussed in more detail with reference to FIG. 11. This triggers the switch deactivation process before the FIFO is completely drained, and can be used to avoid a particular race condition that could otherwise arise, as will be discussed in more detail later with reference to FIG. 11.

The goal of the switch deactivation process performed at step 420 is to relinquish switch ownership of the communication path between the cache and the DDR memory and extract the switch from that link. On deactivation, backpressure is asserted on the command channel C through the C gate 292 until all outstanding accesses seen at the input $C_i$, are issued to the bus M, and all buffered evictions are issued to the output $C_o$, and then at that point the multiplexer control output $S_c$ is set to one to reconnect the primary command channel path. This process relinquishes ownership of the forward bus, and serves to exert backpressure until the forward bus becomes idle in the switch before relinquishing ownership.

Also during deactivation, backpressure is applied to the response channel $R_D$ through the R gate 294 until no responses are seen at the bus M to be outstanding on the response channel, at which point the multiplexer control output $S_R$ is set equal to one to reconnect the primary response channel. This process relinquishes ownership of the backward bus, and basically waits until the backward bus becomes idle before relinquishing ownership.

Once the switch deactivation process has been completed at step 420, then all access commands subsequently issued that target the off-chip memory will be handled in the standard manner and hence pass over the communication path to the DDR memory.

Figure 9:
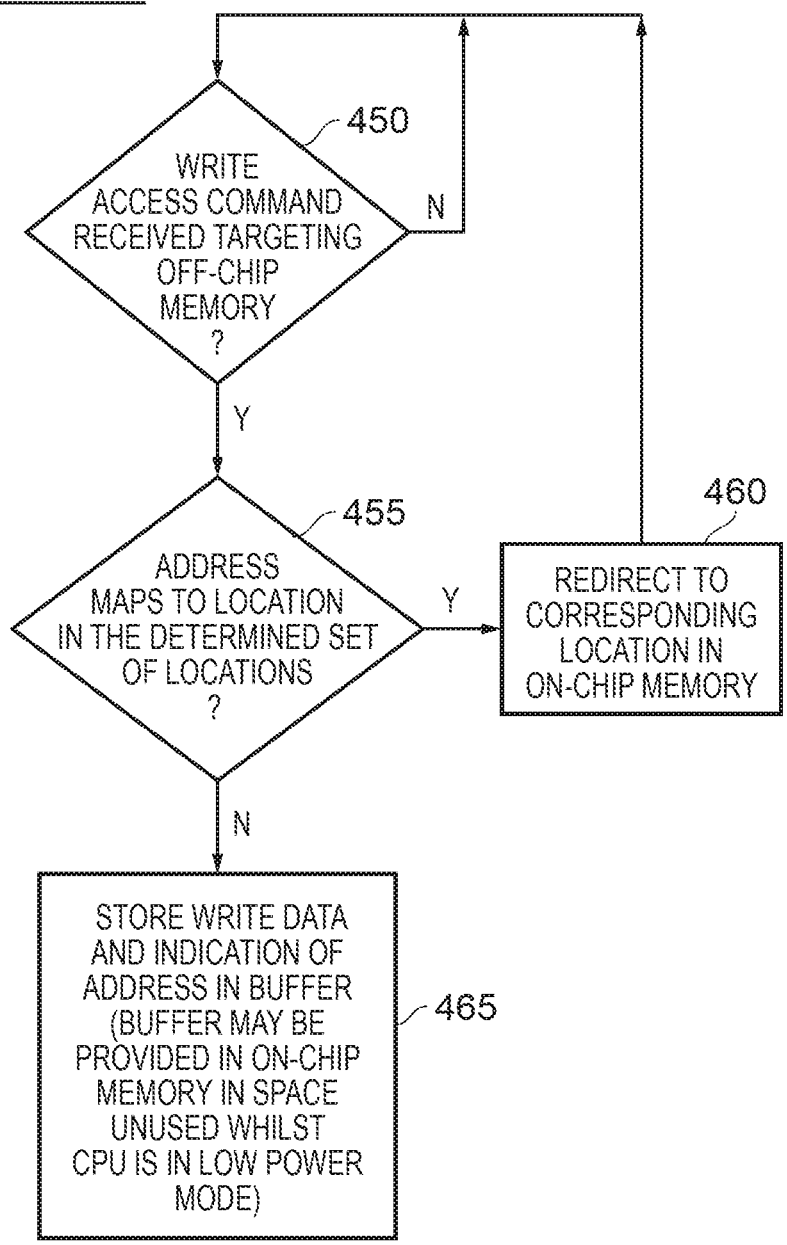
FIG. 9 is a flow diagram illustrating steps performed in order to handle cache evictions whilst the switch is activated, in accordance with one example implementation.

FIG. 9 is a flow diagram illustrating how cache evictions are handled once the switch is activated. At step 450, it is determined if there is a write access command received by the switch that is targeting off-chip memory. If there is, then it is determined at step 455 whether that address maps to a location in the determined set of locations, i.e. whether it is targeting the working set of content that has been migrated to the on-chip memory. If so, the process proceeds to step 460 where the access command is redirected to the corresponding location in the on-chip memory.

However, if it is determined that the address maps to a location in the DDR memory that is not in the determined set of locations tracked by the address translation table in the switch, then the process proceeds to step 465 where the identified write data and an indication of the address in DDR to be accessed is stored in a FIFO buffer. As discussed earlier, in one example implementation this buffer is provided in the on-chip memory in space that is unused whilst the CPU is in the low power mode. As will be apparent from the earlier discussion, by taking these steps, this means that in due course that content can be restored into the DDR memory once the virtualisation process is exited.

Figure 10:
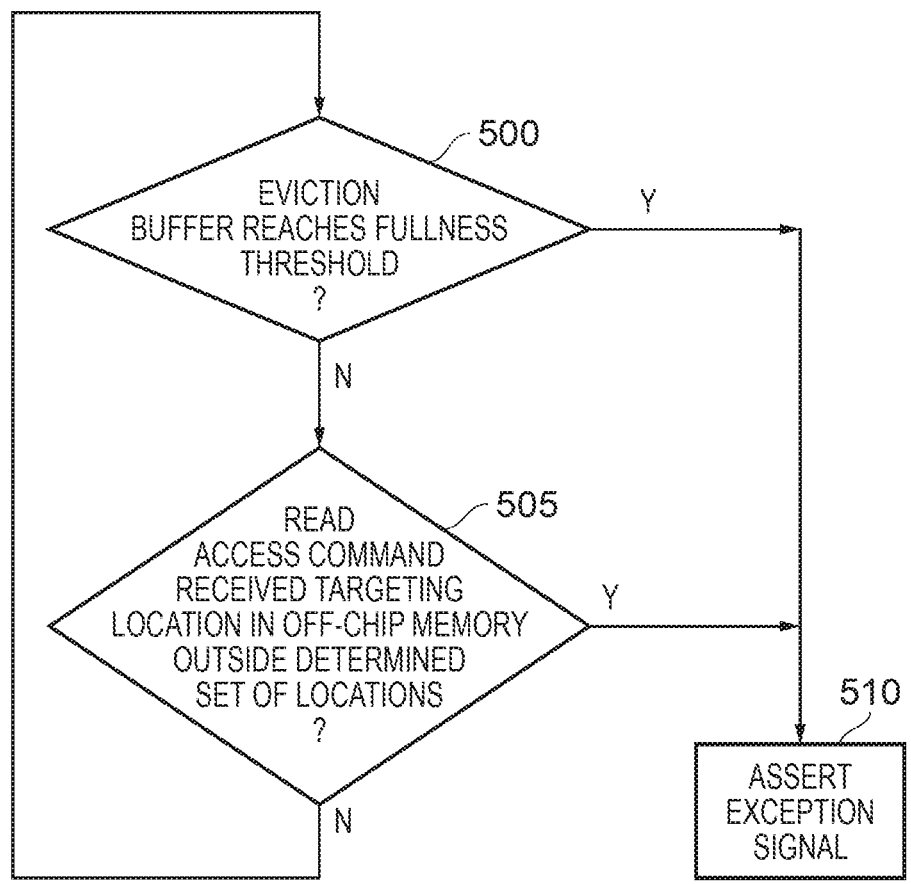
FIG. 10 is a flow diagram illustrating steps performed in order to detect exception conditions, in accordance with one example implementation.

As discussed earlier, the switch is also able to detect certain exception conditions. This is illustrated schematically in FIG. 10. In particular, if the eviction buffer reaches a fullness threshold, this will be detected by the earlier discussed FIFO write address generator 240 within the switch at step 500, and will trigger the assertion of an exception signal at step 510 to the exception manager 280. Similarly, if a read access command is received by the switch that is targeting a location in the off-chip memory that is outside of the determined set of locations that should be accessed by the CPU subsystem when in the low power mode of operation, this will be detected by the address translation table 230 within the switch at step 505, and again trigger assertion of the exception signal at step 510.

Figure 11:
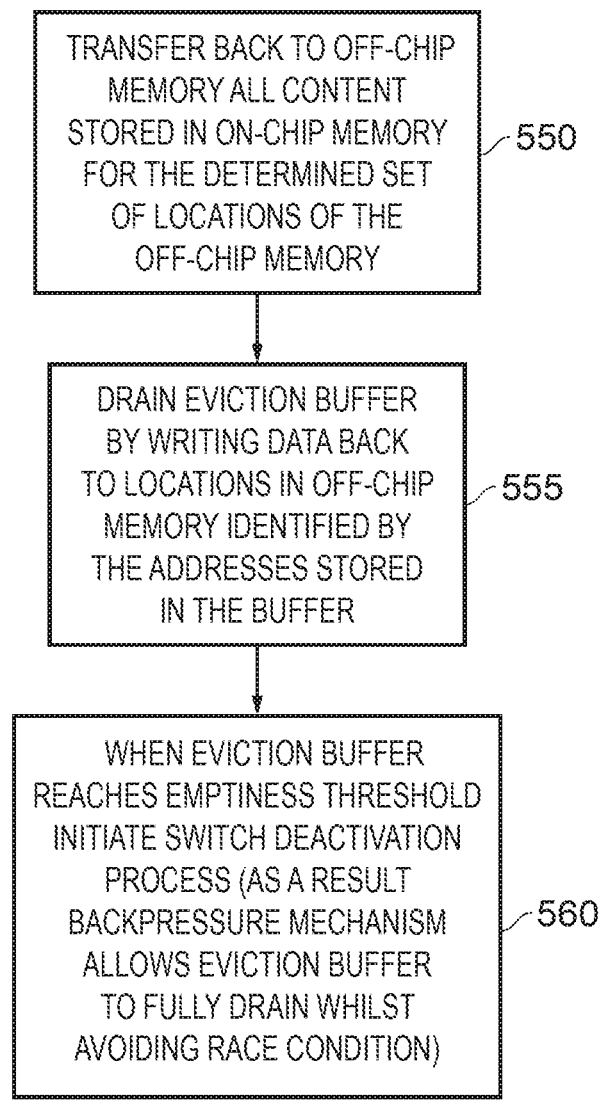
FIG. 11 is a flow diagram illustrating steps performed in order to implement the transfer operation of step 410 of FIG. 8, in accordance with one example implementation.

FIG. 11 is a flow diagram illustrating the performance of the transfer back to the off-chip memory when memory virtualisation is being stopped, and hence illustrates in more detail step 410 of FIG. 8. At step 550, transfer back to the off-chip memory of all contents stored in the on-chip memory for the determined set of locations of the off-chip memory is performed, for example using the earlier-mentioned DMA unit 270. As discussed earlier, the address translation table can keep track of the status of this series of transfers, allowing it to appropriately handle any access commands received from the CPU subsystem during the transfer process that target those locations.

At step 555, the eviction buffer is then drained by writing the data back to locations in the off-chip identified by the addresses stored in the buffer. As discussed earlier, this process can be implemented by the FIFO read address generator 245 within the switch circuitry.

As indicated at step 560, when the eviction buffer reaches an emptiness threshold, typically when the eviction buffer is almost, but not completely, empty, then the switch deactivation process can be initiated, and as a result a backpressure mechanism can be employed to allow the eviction buffer to fully drain whilst avoiding a race condition arising. In particular, during this period, once the switch deactivation process has been initiated, any received write command identifying an address which would typically result in the FIFO write address generator generating information to store in the FIFO buffer will not be accepted, thus allowing the FIFO buffer to be fully drained during the switch deactivation process.

As will be apparent from the above description, the techniques described herein enable significant power consumption benefits to be realised by supporting virtualisation of a chosen memory (for example external memory) during periods of time where the CPU subsystem is operating in a low power mode of operation. The technique is architecturally invisible, so avoids the requirement to perform time intensive operations such as cache maintenance operations and TLB reconfigurations operations. Further, the technique does not require significant stalling of the SoC components that are accessing the chosen memory, and does not affect the critical paths and latency to the chosen memory.

Whilst the size of transported data can be high, it has been found that the address range or ranges within which that data resides is typically relatively small, and indeed lightweight address translation features often only require a single address range. Furthermore, the range of the issued data can be linearly increased over time as the data is linearly issued over time, and there is no need for a coarse page-level granularity.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware that provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform operations;
a communication path employed by the processing circuitry to access a first memory; and
switch circuitry arranged, when activated, to be connected to the communication path;
wherein:
the processing circuitry is arranged to issue access commands specifying addresses to be accessed, each address being mapped to a location in a memory system in accordance with a system address map, the memory system comprising at least the first memory and a second memory;
the processing circuitry is arranged, when in a particular mode, to perform operations that require access to only a subset of the locations provided in the first memory;
the switch circuitry is arranged, while the processing circuitry is in the particular mode, to be activated in order to intercept the access commands issued over the communication path that specify addresses mapped by the system address map to locations within the subset of locations, and to redirect those access commands to locations within the second memory that are otherwise unused while the processing circuitry is in the particular mode;
cache storage useable by the processing circuitry to cache content associated with addresses mapped to locations in the first memory, the cache storage being arranged, on eviction of a block of content from the cache storage, to issue a write access command over the communication path specifying both the evicted block of content and an address of a location in the first memory to which that evicted block of content is to be stored, wherein the switch circuitry is arranged while activated, to intercept the write access commands issued by the cache storage; and buffer storage allocated for use by the switch circuitry, wherein the switch circuitry is arranged, in response to intercepting a write access command issued by the cache storage that specifies an address that maps to a location in the first memory outside of the subset of locations to be accessed by the processing circuitry when in the particular mode, to store the evicted block of content and an indication of the specified address in the buffer storage.

2. An apparatus as claimed in claim 1, wherein the particular mode is a low power mode of operation.

3. An apparatus as claimed in claim 1, wherein the second memory is more energy efficient to access than the first memory.

4. An apparatus as claimed in claim 1, further comprising:
transfer circuitry arranged, in response to the switch circuitry being activated, to transfer, for each location within the subset of locations of the first memory, content stored in that location to an associated location in the second memory that is otherwise unused while the processing circuitry is in the particular mode.

5. An apparatus as claimed in claim 4, wherein:
the switch circuitry is arranged to maintain a record identifying the locations within the subset of locations of the first memory whose content has been transferred, and to only redirect a given intercepted access command to the second memory once the record identifies that the location in the first memory identified by the address specified by that given intercepted access command has had its content transferred.

6. An apparatus as claimed in claim 5, wherein the switch circuitry, when activated, is responsive to receipt of an access command that specifies an address identifying a location in the first memory that the record indicates has not yet had its content transferred, to suppress acceptance of that access command until the content for that identified location has been transferred to the second memory.

7. An apparatus as claimed in claim 4, wherein:
the switch circuitry is arranged, once the content stored within all of the locations forming the subset of locations has been transferred to the second memory, to issue a memory release signal to power management circuitry to allow the first memory to be placed within a low power state.

8. An apparatus as claimed in claim 7, further comprising one or more interface components used to connect to the first memory, and the memory release signal issued by the switch circuitry further allows the one or more interface components to be powered down.

9. An apparatus as claimed in claim 1, wherein:
the switch circuitry is responsive to the buffer circuitry reaching a threshold fullness level, to issue an exception signal to trigger an exception handling routine to be executed.

10. An apparatus as claimed in claim 1, wherein the buffer storage is allocated within available locations of the second memory that are otherwise unused while the processing circuitry is in the particular mode.

11. An apparatus as claimed in claim 1, wherein:
the switch circuitry is arranged, in response to intercepting a read access command specifying an address that maps to a location in the first memory outside of the subset of locations to be accessed by the processing circuitry when in the particular mode, to issue an exception signal to trigger an exception handling routine to be executed.

12. An apparatus as claimed in claim 1, wherein:
the apparatus forms a system-on-chip, the first memory is off-chip memory, the second memory is on-chip memory, and the communication path is a path to off-chip memory.

13. An apparatus comprising:
processing circuitry to perform operations;
a communication path employed by the processing circuitry to access a first memory; and
switch circuitry arranged, when activated, to be connected to the communication path;
wherein:
the processing circuitry is arranged to issue access commands specifying addresses to be accessed, each address being mapped to a location in a memory system in accordance with a system address map, the memory system comprising at least the first memory and a second memory;
the processing circuitry is arranged, when in a particular mode, to perform operations that require access to only a subset of the locations provided in the first memory;
the switch circuitry is arranged, while the processing circuitry is in the particular mode, to be activated in order to intercept the access commands issued over the communication path that specify addresses mapped by the system address map to locations within the subset of locations, and to redirect those access commands to locations within the second memory that are otherwise unused while the processing circuitry is in the particular mode;
the switch circuitry is activated in response to an activation command;
the switch circuitry is responsive to the activation command to perform an activation process in order to cause the switch circuitry to be connected to the communication path;
selection circuitry provided within the communication path to select between a primary path bypassing the switch circuitry and a secondary path incorporating the switch circuitry; and
the switch circuitry is arranged to perform the activation process by employing a backpressure mechanism to temporarily stop traffic passing over the primary path, and by controlling the selection circuitry to change its selection from the primary path to the secondary path such that the switch circuitry is connected to the communication path at a point in time where the application of the backpressure mechanism has ensured that the interception of communications by the switch circuitry occurs without compromising a communication protocol used to control traffic flow over the communication path.

14. An apparatus as claimed in claim 13, wherein:
the communication path comprises a command channel and a response channel;
the selection circuitry comprises first selection circuitry for the command channel and second selection circuitry for the response channel; and
the backpressure mechanism is employed such that the switch circuitry is first connected to the command channel and thereafter connected to the response channel.

15. An apparatus as claimed in claim 14, wherein each channel employs a handshake protocol, and the backpressure mechanism is used to delay a handshake signal within each of the command channel and the response channel for one or more clock cycles.

16. An apparatus as claimed in claim 15, wherein:
the backpressure mechanism is arranged to delay the handshake signal within the command channel until any outstanding command issued over the primary path of the command channel has also been propagated through the switch circuitry, and is arranged to delay a handshake signal within the response channel until no outstanding response traffic is present on the primary path of the response channel.

17. An apparatus comprising:
processing circuitry to perform operations;
a communication path employed by the processing circuitry to access a first memory; and
switch circuitry arranged, when activated, to be connected to the communication path;
wherein:
the processing circuitry is arranged to issue access commands specifying addresses to be accessed, each address being mapped to a location in a memory system in accordance with a system address map, the memory system comprising at least the first memory and a second memory;
the processing circuitry is arranged, when in a particular mode, to perform operations that require access to only a subset of the locations provided in the first memory;
the switch circuitry is arranged, while the processing circuitry is in the particular mode, to be activated in order to intercept the access commands issued over the communication path that specify addresses mapped by the system address map to locations within the subset of locations, and to redirect those access commands to locations within the second memory that are otherwise unused while the processing circuitry is in the particular mode;
in response to a redirection end command, the switch circuitry is arranged to:
issue a memory required signal to power management circuitry to request that the first memory, when in a low power state, is exited from the low power state;
trigger transfer circuitry to transfer back to the first memory the content of the first memory that has been stored in the second memory due to the activation of the switch circuitry; and
perform a deactivation process in order to cause the switch circuitry to be disconnected from the communication path;
the transfer circuitry is arranged to transfer back to the first memory all content stored in the second memory that is associated with addresses mapping to the subset of locations of the first memory, and the switch circuitry is arranged to keep a record identifying the locations within the subset of locations of the first memory whose content has been transferred back to the first memory; and
the transfer circuitry is further arranged to transfer back to the first memory any evicted write data from cache storage that was intercepted by the switch circuitry and held in a buffer, where that evicted write data specifies an address that maps to a location in the first memory outside of the subset of locations to be accessed by the processing circuitry when in the particular mode.

18. An apparatus as claimed in claim 17, further comprising:
selection circuitry provided within the communication path to select between a primary path bypassing the switch circuitry and a secondary path incorporating the switch circuitry; and
the switch circuitry is arranged to perform the deactivation process by employing a backpressure mechanism to temporarily stop traffic passing over the secondary path, and by controlling the selection circuitry to change its selection from the secondary path to the primary path such that the switch circuitry is disconnected from the communication path at a point in time where the application of the backpressure mechanism has ensured that the disconnection of the switch circuitry from the communication path occurs without compromising a communication protocol used to control traffic flow over the communication path.

19. An apparatus as claimed in claim 18, wherein the switch circuitry is arranged to initiate the deactivation process when the buffer holding the evicted write data reaches an emptiness threshold, with the backpressure mechanism being maintained until the buffer is empty.

* * * * *